(12) United States Patent
Masoud

(10) Patent No.: US 12,160,790 B1
(45) Date of Patent: *Dec. 3, 2024

(54) METHOD FOR ESTIMATING CHANNEL CHARACTERISTICS OF WIRELESS COMMUNICATIONS

(71) Applicant: KING FAHD UNIVERSITY OF PETROLEUM AND MINERALS, Dhahran (SA)

(72) Inventor: Ahmad A. Masoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,007

(22) Filed: Aug. 5, 2024

Related U.S. Application Data

(63) Continuation of application No. 17/847,981, filed on Jun. 23, 2022, now Pat. No. 12,108,304.

(51) Int. Cl.
  *H04W 4/38* (2018.01)
  *H04W 4/024* (2018.01)
  *H04W 4/029* (2018.01)

(52) U.S. Cl.
  CPC .......... *H04W 4/024* (2018.02); *H04W 4/029* (2018.02); *H04W 4/38* (2018.02)

(58) Field of Classification Search
  CPC ........ H04W 4/024; H04W 4/029; H04W 4/38
  See application file for complete search history.

(56) References Cited

U.S. PATENT DOCUMENTS

2018/0359037 A1* 12/2018 Gresset ................. H04W 4/029
2022/0173703 A1*  6/2022 Ranta ................... H03F 1/3241

FOREIGN PATENT DOCUMENTS

| CN | 110868716 A | 3/2020 |
| WO | WO 2005/096577 A1 | 10/2005 |

OTHER PUBLICATIONS

E. Gómez-Déniz, et al., "A generalisation of the Rayleigh distribution with applications in wireless fading channels", Wireless Communications and Mobile Computing, 2011, 10 pages.
(Continued)

*Primary Examiner* — Christopher M Brandt
(74) *Attorney, Agent, or Firm* — Oblon, McClelland, Maier & Neustadt, L.L.P.

(57) ABSTRACT

A system, method, and non-transitory computer readable medium that utilizes a distance transformation vector constructed of a probability distribution function (PDF) and a distribution parameter ξ in the estimation process for precise and effective PDF estimation. The system includes a mobile wireless agent, a base station and a computing device interconnected over a wireless communication network. The wireless meter transmits sensory information to the computing device, where the sensory information is processed to estimate characteristics of the wireless communication signal based on the Rayleigh estimator. For the estimation, a distance transformation vector of the PDF and a distribution parameter are constructed. The estimated parameters along with a motion actuation plan are sent to the base station, which uses the estimated parameters in transmitting the motion actuation plan to the mobile wireless agent.

8 Claims, 25 Drawing Sheets

(56) References Cited

OTHER PUBLICATIONS

D. Yevick, "Multicanonical communication system modeling-application to PMD statistics", IEEE Photonics Technology Letters, vol. 14, Issue 11, Dec. 10, 2002, pp. 1512-1514 (Abstract only).

Václav Hlaváč, "Probability density estimation; Parametric methods", Czech Technical University in Prague, Czech Institute of Informatics, Robotics and Cybernetics, http://people.ciirc.cvut.cz, Mar. 31, 2022, 38 pages.

Ahmad A. Masoud, "A Nonlinear Subspace Approach for Parametric Estimation of PDFs From Short Data Records With Application to Rayleigh Fading", IEEE Access, vol. 10, Mar. 8, 2022, pp. 26895-26906.

* cited by examiner

METHOD FOR ESTIMATING CHANNEL CHARACTERISTICS OF WIRELESS COMMUNICATIONS

CROSS-REFERENCE TO RELATED APPLICATIONS

The present application is a Continuation of U.S. application Ser. No. 17/847,981, now allowed, having a filing date of Jun. 23, 2022.

STATEMENT REGARDING PRIOR DISCLOSURE BY THE INVENTORS

Aspects of this technology are described in an article "A Nonlinear Subspace Approach for Parametric Estimation of PDFs From Short Data Records With Application to Rayleigh Fading" published in IEEE Access, Vol. 10, pp. 26895-26906, Mar. 8, 2022, which is incorporated herein by reference in its entirety.

BACKGROUND

Technical Field

The present disclosure is directed to the estimation of the parameters of stochastic signals from short data records.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The prediction of wireless channel characteristics is important in controlling the quality of data communications. The probability distribution function (PDF) of the signal strength is a strong characterizer of channel performance. Many techniques have been suggested for the estimation of PDFs from wirelessly received signal strengths. These techniques may be divided into two types: parametric estimators and nonparametric estimators. The different types of communication channels are well characterized and the type of PDF that can accurately identify a channel with a certain behavior is known beforehand. For example, communication channels in clutter-free or lightly cluttered environments experience slow fading and are best described by a lognormal PDF. Channels in heavily cluttered environments experience fast fading which is best described by a Rayleigh PDF. Therefore, in situations relating to wireless communication, parametric PDF estimation is of practical value in noisy or cluttered environments.

Although estimation of signal parameters is a highly evolved area, new critical applications, such as sensing-aware mobility and communication-aware mobility have significantly increased the restrictions on estimation processes in order to make them implementable in real-time. (See: Waqas Afzal and Ahmad A. Masoud, "Harmonic Potential-Based Communication-Aware Navigation of Mobile Agents in Cluttered Spaces", 2016 IEEE 55th Conference on Decision and Control (CDC), ARIA Resort & Casino Dec. 12-14, 2016, Las Vegas, USA, pp. 5146-5151; Daniel Licea, Moises Bonilla, Mounir Ghogho, Samson Lasaulce, Vineeth Varma. "Communication-aware energy-efficient trajectory planning with limited channel knowledge". IEEE Transactions on Robotics, IEEE, 2020, 36 (2), pp. 431-442; and Y. Yan and Y. Mostofi, "Co-optimization of communication and motion planning of a robotic operation under resource constraints and in fading environments," IEEE Trans. Wirel. Commun., vol. 12, no. 4, pp. 1562-1572, April 2013, each incorporated herein by reference in its entirety).

In risky and hazardous environments and missions, such as reconnaissance, search and rescue missions in areas struck by natural disasters (e.g., conducting search and rescue operations in areas with collapsed buildings as a consequence of an earthquake or such natural disaster), surveillance for various applications (e.g., defense, military, or predicting or estimating an extent of uncertain events), and exploration (e.g., oil, minerals, land-mines, seismic activities prone areas, and such), human intervention is to be preferably avoided entirely or kept at a minimum level. In such environments, where access by humans is limited, a scout mobile agent may be sent to perform the operations, to gather the information needed. The scout mobile agent, in one example, is an autonomous device configured for path-finding and data collection in confined spaces having no accessibility to humans. The mobile agents are mounted with a multitude of sensors to gather data related to one or more parameters, such as geolocation, the temperature of the surroundings, obstacles in the path, activity detection, communication detection, and such. Data relating to such parameters and collected by the multitude of sensors is transmitted, through wireless communication channels, to a base station, where the data is used as an input for computation processes predicting forthcoming events and for estimating a plan of action.

Signals transmitted by the scout mobile agents from such hostile, risky, confined, and hazardous environments cannot be deterministic, and hence, cannot be expressed or predicted using analytic equations, as an element of uncertainty is associated with them. Therefore, the Probability Distribution Function (PDF) can be estimated to determine the probability distribution of the signal and used to plan a motion actuation signal for the scout mobile agent. For precise estimation of the PDF, the prediction of wireless channel characteristics is an important aspect. Numerous techniques have been implemented for the estimation of PDFs from wirelessly received signal strengths. Such techniques can be broadly classified as parametric estimators or non-parametric estimators. A type of estimator that can precisely identify the communication channel characteristics is based on the type of communication channel subjected to the estimation.

Even though signal parameter estimation is known, new critical applications, such as sensing-aware mobility and communication-aware mobility, have increased the complexity of estimation processes to when it is necessary to make these processes implementable in real-time. For example, the scout agent is required to access a confined highly cluttered space and wirelessly relay sensory data to the base station, or receive the motion servo data from the base station. The nature of the surrounding environment causes considerable fading and shadowing effects in the wireless signal. In addition, interrupting the data feed to and from the base station causes instability of motion. To overcome these hurdles, several PDF techniques have been discussed in the art.

PDF techniques can be broadly described as an unbiased closed form and a non-closed form. One estimation method of the unbiased close form utilizes a maximum likelihood approach. Another technique is a Bayes-based parameter estimation that uses precautionary loss function, entropy loss function, and loss function −L1. A Blackwell-Rao sense of the parameter has been described. (See: Peritsky, M., 1973. Statistical Estimation of Mean Signal Strength in a Rayleigh-Fading Environment". IEEE Transactions on Communications, 21(11), pp. 1207-1213, incorporated herein by reference in its entirety). Methods for PDF estimation using the non-closed form include Mente Carlo Expectation Mazimization (MCEM) and fuzzy logic. There exist techniques that generalize the Rayleigh distribution, e.g., the weighted Rayleigh distribution, the two parameter Rayleigh distribution, and the generalized Rayleigh distribution, in order to enhance its utility. Along with the Rayleigh distribution, other artifacts, such as shadowing and slow fading are of significant importance and are described by the lognormal distribution. Joint actuation and estimation also require the estimators to be able to produce reliable and accurate estimates in real-time from a small record of data.

The current art is silent regarding utilizing a distance transformation vector constructed of a PDF and a distribution parameter in the estimation of precise and effective PDFs.

Accordingly, it is one object of the present disclosure to provide methods and systems for estimating the parameters of the stochastic signals, where communication channel characteristics are based on a Rayleigh distribution represented by a continuous PDF, where the Rayleigh PDF characterizes the communication channels in heavily cluttered environments.

SUMMARY

In an exemplary embodiment, a system for using Rayleigh probability density functions, PDF, to obtain estimates of channel characteristics for wireless communications is described. The system includes a computing device configured to generate motion actuation signals and to transmit the motion actuation signals. The system also includes a mobile wireless agent having an antenna configured to receive the motion actuation signals, a navigation circuitry configured to use the motion actuation signals to navigate to a physical sensing location, a plurality of sensors configured to capture sensory information at N sample points in a sample space, S, of the physical sensing location. The coordinates of the N sample points of the sensory information are random variables. The system includes a communication circuitry configured to transmit the sensory information over a wireless communications channel having unknown channel characteristics. The system further includes a base station wirelessly connected to the computing device and the mobile wireless agent, wherein the base station includes a receiver configured to receive the the sensory information from the mobile wireless agent over the wireless communication channel having unknown channel characteristics and a transmitter configured to transmit the sensory information to the computing device. The computing device includes a communications device, a memory storing program instructions and a microprocessor configured to perform the program instructions to: construct a histogram from the coordinates of the random variables of the sensory information; construct a set of parameterized Rayleigh probability density functions, PDF, S, from the histogram, where each x represents a set of the coordinates in the sample space and is a parameter vector containing a set of L parameters for each $x_i$, where i=1, 2, ..., N; construct a parameterized vector, $\Psi(\xi)$, from the set of the parameterized Rayleigh PDFs, $P_X(x_i, \xi)$; form a transformation vector, $\hat{\Psi}$, from the histogram for each x; determine a distance, $D(\xi)$, between the transformation vector, $\hat{\Psi}$, and the parameterized vector $\Psi(\xi)$; minimize an absolute value of the distance, $D(\xi)$; form a Jacobian matrix, $J_\xi$, by calculating a partial derivative of the parameterized vector, $\Psi(\xi)$, for each $\xi$; calculate a dot product between a transpose of the Jacobian matrix $J_\xi$, and the distance, $D(\xi)$; minimize the dot product; determine a value of each parameter vector, $\xi$, which minimizes the dot product; estimate a set of parameters of the channel characteristics of the wireless communications channel from each set of L parameters of each $\xi$; generate the motion actuation signals for the mobile wireless agent based on the estimated set of parameters; transmit the motion actuation signals and the estimated set of parameters to the base station; and transmit, by the base station, the motion actuation signals on the wireless communication channel using the estimated set of parameters of the channel characteristics, to the mobile wireless agent.

In an exemplary embodiment, a method of obtaining estimates of channel characteristics for wireless communications is disclosed. The method includes capturing, with a plurality of sensors of a mobile wireless agent, sensory information at N sample points in a sample space, S, of a physical sensing location. The coordinates of the N sample points are random variables. The method also includes transmitting, by a communication circuitry of the mobile wireless agent, the sensory information over a wireless communication channel having unknown channel characteristics. The method further includes receiving, by a base station, the sensory information. The method also includes transmitting, by the base station, the sensory information. In addition, the method includes receiving, by a communications device of a computing device, the sensory information from the base station. The method also includes performing, by the computing device, the steps of: constructing a histogram, comprising N samples, from the coordinates of the random variables of the sensory information, constructing a set of parameterized Rayleigh probability density functions, PDF, $P_X(x_i, \xi)$ from the N samples of the histogram, where each x represents a set of coordinates in the sample space and $\xi$ is a parameter vector containing a set of L parameters for each x, where i=1, ..., N, constructing a parameterized vector, $\Psi(\xi)$, from the set of the parameterized Rayleigh PDFs, $P_X(x_i, \xi)$, forming a transformation vector, $\hat{\Psi}$, from the histogram for each x, determining a distance, $D(\xi)$, between the transformation vector, $\hat{\Psi}$, and the parameterized vector $\Psi(\xi)$, minimizing an absolute value of the distance, $D(\xi)$, forming a Jacobian matrix, $J_\xi$, by calculating a partial derivative of the parameterized vector, $\Psi(\xi)$, for each $\xi$, calculating a dot product between a transpose of the Jacobian matrix, $J_\xi$ and the distance, $D(\xi)$, minimizing the dot product, determining a value of each parameter vector, $\xi$, which minimizes the dot product, estimating a set of parameters of the unknown channel characteristics from each set of L parameters of each $\xi$, generating motion actuation signals for the mobile wireless agent based on the estimated set of parameters of the channel characteristics, transmitting, by the communications device, the motion actuation signals and the estimated set of parameters to the base station, and transmitting, by the base station, the motion actuation signals on the wireless communication channel using the estimated set of parameters of the channel characteristics, to the mobile wireless agent.

In another exemplary embodiment, a non-transitory computer readable medium having instructions stored therein that, when executed by a microprocessor, causes the microprocessor to perform a method of obtaining estimates of channel characteristics for wireless communications. The method includes receiving, from a mobile wireless agent, sensory information at N sample points in a sample space, S, of a physical sensing location, wherein coordinates of the N sample points are random variables over a wireless communication channel having unknown channel characteristics. The method also includes constructing a histogram, comprising N samples, from the coordinates of the random variables of the sensory information. The method further includes constructing a set of parameterized Rayleigh probability density functions, PDF, $P_X(x_i, \xi)$ from the N samples of the histogram, where each x represents a set of coordinates in the sample space and $\xi$ is a parameter vector containing a set of L parameters for each $x_i$, where i=1, ..., N. In addition, the method includes constructing a parameterized vector, $\Psi(\xi)$, from the set of the parameterized Rayleigh PDFs, $P_X(x_i, \xi)$. The method further includes forming a transformation vector, $\hat{\Psi}$, from the histogram for each $x_i$. The method also includes determining a distance, $D(\xi)$, between the transformation vector, $\hat{\Psi}$, and the parameterized vector $\Psi(\xi)$. The method further includes minimizing an absolute value of the distance, $D\xi()$. The method also includes forming a Jacobian matrix, $J_\xi$, by calculating a partial derivative of the parameterized vector, $\Psi(\xi)$, for each $\xi$. The method further includes calculating a dot product between a transpose of the Jacobian matrix, $J_\xi$ and the distance, $D(\xi)$. The method also includes minimizing the dot product. The method further includes determining a value of each parameter vector, $\xi$, which minimizes the dot product. The method also includes estimating a set of parameters of the unknown channel characteristics from each set of L parameters of each $\xi$. The method includes generating motion actuation signals for the mobile wireless agent based on the estimated set of parameters. The method also includes transmitting the motion actuation signals and the estimated set of parameters to the base station. The method further includes transmitting, by the base station, the motion actuation signals on the wireless communication channel using the estimated set of parameters of the channel characteristics, to the mobile wireless agent.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
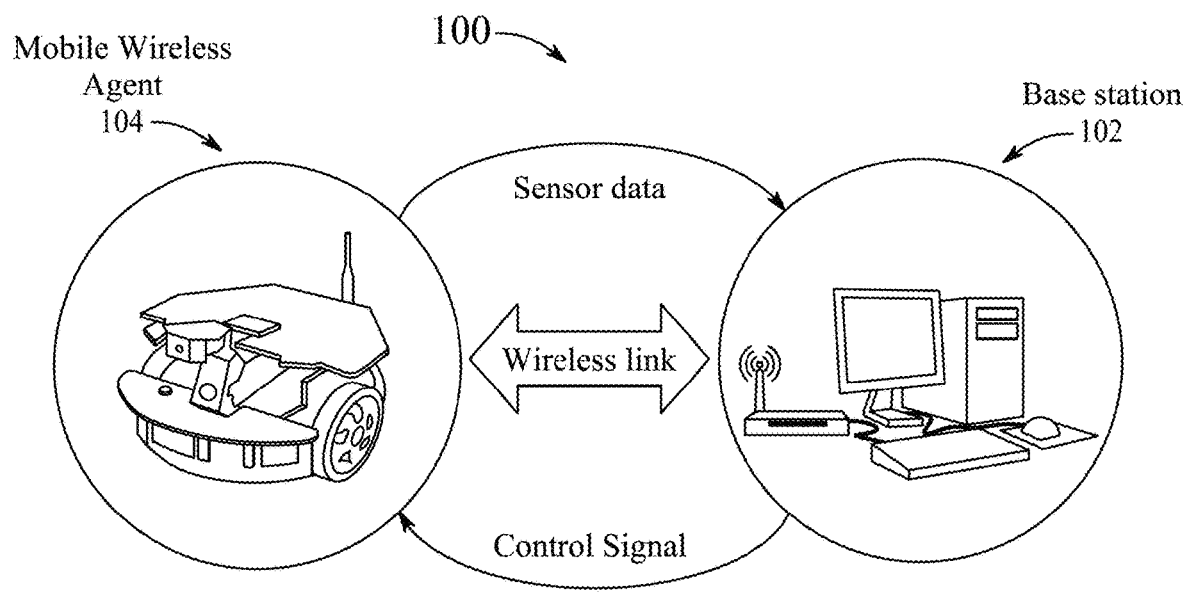
FIG. 1A is a schematic diagram of wireless communication between a scout mobile agent and a base station, according to certain embodiments.

In the drawings, like reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and methods for obtaining estimates of wireless channel characteristics for signals transmitted by a mobile wireless agent, utilizing probability distribution functions (PDFs). The mobile wireless agent can be an unmanned vehicle, a robot, a drone, or any mobile unit capable of autonomous navigation and wireless data communication. In an aspect of the present disclosure, the mobile wireless agent may be an unmanned aerial drone.

In an aspect of the present disclosure, mobile wireless agents are mounted with a multitude of sensors to gather data related to one or more parameters, such as geolocation, the temperature of the surroundings, obstacles in the path, activity detection, communication detection, and such data. Data relating to such parameters and collected by the multitude of sensors is transmitted, through wireless communication channels, to a base station. The base station, in one implementation, is a dedicated core computing infrastructure capable of establishing wireless bi-directional communication with the mobile agent and performing data computation and data processing on the data received from the mobile agent. The data computation and the data processing may predict forthcoming events in the environment where the mobile agent is scouting and, accordingly, prepare an action plan for the mobile agent. In one example, the data computation and processing are performed by a processor integrated with the base station. In an aspect, the processor is an element of a computing device coupled to the base station.

In one example, the mobile wireless agent may perform a rescue operation launched in response to manmade disasters (e.g., explosive attacks, war, an act of terrorism, fire breakout, and the like) or natural disasters (e.g., earthquakes, hurricanes, flooding and the like). For any rescue operation, the mobile agent can specifically be configured to conduct surveillance in the affected terrain, navigate itself through confined spaces or obstacles, collect sensory data indicative of the environment, and communicate with the base station.

The mobile agents are equipped with at least three types of sensors, e.g., visual sensors, torque sensors, and tactile sensors, for identifying respective robotic control strategies, e.g., visual servoing control, force control, and tactile control. A few examples of the sensor include a temperature sensors, gas sensors, image sensors, ultrasonic sensors, infrared sensors, laser sensors, gyroscopes, and accelerators. In an example of a mobile agent deployed for a rescue mission at earthquake affected site where buildings, trees, and other infrastructure are collapsed with a possibility of residents trapped underneath the collapsed buildings, the mobile agent may be deployed to traverse through the confined spaces, such as hollow gaps between segments or fragments of the collapsed buildings, detect any presence of a live human or animal trapped inside, send the exact location of the live human or the animal and all other parameters vital for conducting a rescue to a disaster management and rescue team. For this purpose, the mobile agent may be equipped with an infrared sensor, a CO2 sensor, a thermal camera, and a microphone, and sensory data captured by the sensors may be transmitted to the base station for data processing. In one instance, an infrared sensor may detect obstacles, and accordingly, the base station may evaluate a route for the mobile agent through the terrain. In another instance, the thermal camera may capture images of the surroundings, and the base station may process the images to detect the presence of humans or animals.

Similarly, in one application, the mobile agent can use infrared sensors to avoid impacting walls when traveling in the coal mine. In another application, the mobile agent can be equipped with an infrared sensor, an imaging sensor, a proximity sensor, a displacement sensor, and a distance sensor to detect the location of an explosive placement, a size of the explosive, and images of the explosive device. It can be understood that detection and transmission of such sensory data, from an environment where a human cannot reach or poses a life-threatening risk, is of paramount importance. To conduct such operations, the data transmitted by the mobile agent must be analyzed and processed with utmost accuracy and speed.

However, because signals transmitted by the mobile agents cannot be expressed or predicted using analytic equations, an element of uncertainty is associated with them, i.e., the signals are referred to as stochastic signals. Therefore, the Probability Distribution Function (PDF) is estimated to determine the probability distribution of the signal in order to plan a motion actuation signal for the mobile agent. For precise estimation of the PDF, the prediction of the wireless channel characteristics is an important aspect in receiving data and transmitting commands to the mobile wireless agent. The prediction of the wireless channel characteristics significantly contributes to controlling the quality of the data communication. The probability distribution function (PDF) of the signal strength is a strong characterizer of channel performance. The present disclosure further describes a distance transformation vector constructed using the PDF at sample points based on a distribution parameter $\xi$. The distribution parameter is derived from motion actuation in a parameter space.

FIG. 1A illustrates a block diagram of a wireless channel system 100, referred as to the system 100 hereinafter. In one implementation, the system 100 is implemented on a mobile wireless agent 104 in a confined cluttered space. As depicted in FIG. 1A, the system 100 includes a mobile wireless agent 104 connected to a base station 102 over a wireless communication network. The mobile wireless agent 104 can be an autonomous mobile meter, Unmanned Ground Vehicle (UGV), Unmanned Marine Vehicle (UMV), Unmanned Aerial Vehicle (UAV), hereinafter referred as to the Vehicle (UAV), or a robot embedded with a multitude of sensors, hereinafter referred as to the sensors. Examples of the sensors include light sensors, proximity sensors, sound sensors, temperature sensors, acceleration sensors, and the like. The sensors are employed to collect sensory information pertaining to one or more environmental parameters, such as light, distance from an object, sound, temperature, speed, and such parameters. The sensory information is transmitted, over the wireless communication network, to the base station 102 which includes computational processors to process the sensory information received from the mobile wireless agent 104 for predicting the forthcoming events and generating an action plan for the mobile wireless agent 104. The action plan is relayed to the mobile wireless agent 104 from the base station 102. The action plan may include, but is not limited to, commands to actuate any one of the sensors, commands to navigate the environment, commands to execute one or more tasks, and such plans. The wireless signals are short data records which must be transmitted/received and analyzed or implemented in a few microseconds for effective response by the mobile agent.

Figure 1B:
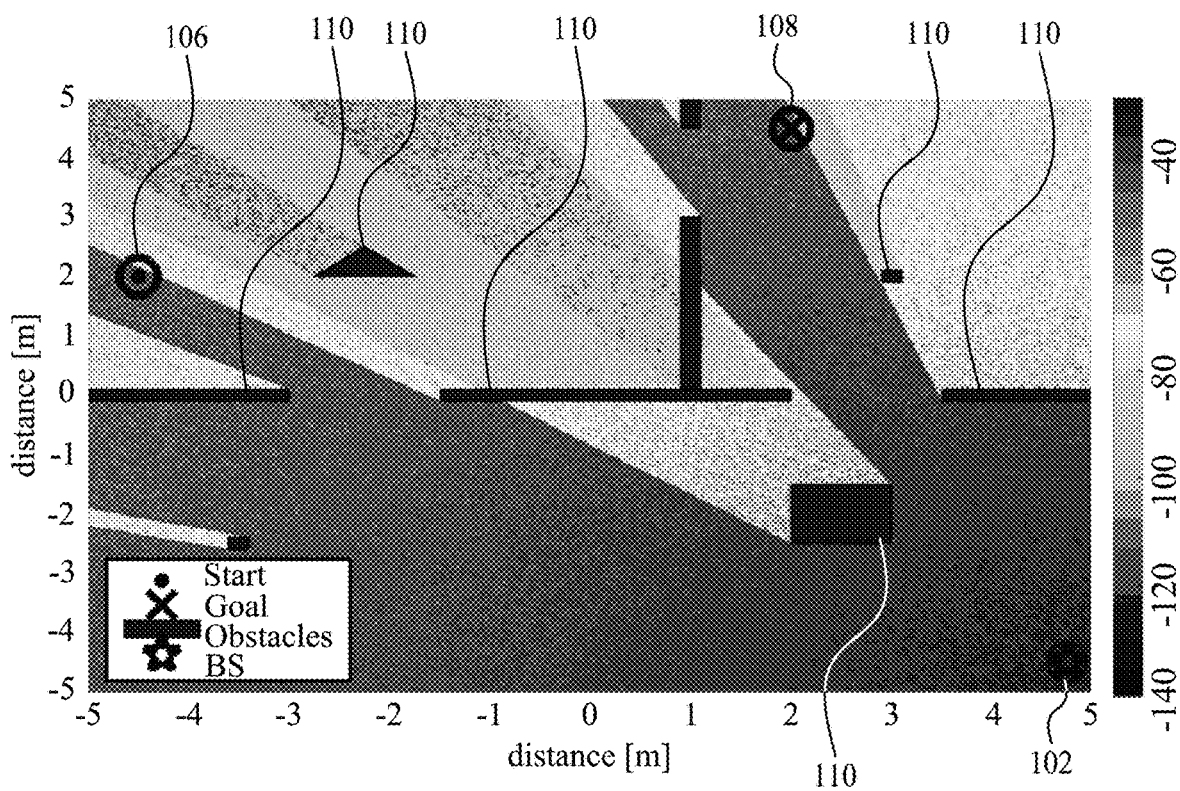
FIG. 1B depicts a fading and shadowing effect in a wireless communication signal obtained by the scout mobile agent, according to certain embodiments.

FIG. 1B, in view of FIG. 1A, depicts fading and shadowing effects in the wireless signal transmitted by the mobile wireless agent 104 to the base station 102 from the confined, cluttered environment. As depicted in the FIG. 1B, the mobile wireless agent 104 begins scouting from a start point 106 towards destination point 108. The mobile wireless agent 104 may face one or more obstacles of different shapes and characteristics, collectively referred to as the obstacles 110. Obstacles 110 may cause the shadowing effects. The mobile wireless agent 104 captures the data indicative of the presence of the obstacles in the path, and the shadows resulting from the obstacles. Subsequently, the mobile wireless agent 104 transmits the captured data to the base station 102.

As described earlier, the estimation of wireless communication channel characteristics is significantly important in executing the scouting mission. In such a situation, the mobile wireless agent 104 is configured to exchange, over the wireless communication channel, a plurality of causality packets with the base station 102 within an interval of a few microseconds. The causality packet may contain a sensing action, a planning action, an actuation action, and an estimation action. Such required frequent transmission of the causality packet leaves inadequate data and insufficient time for data transmission, by the mobile wireless agent 104 to the base station 102, for the computation of the channel PDF. Considering the time and data constraints, it is difficult to make more than one or two hundred data samples available for the computation of the PDF. Therefore, reliable estimation of channel characteristics, using existing estimation techniques, is considerably difficult.

Figure 1C:
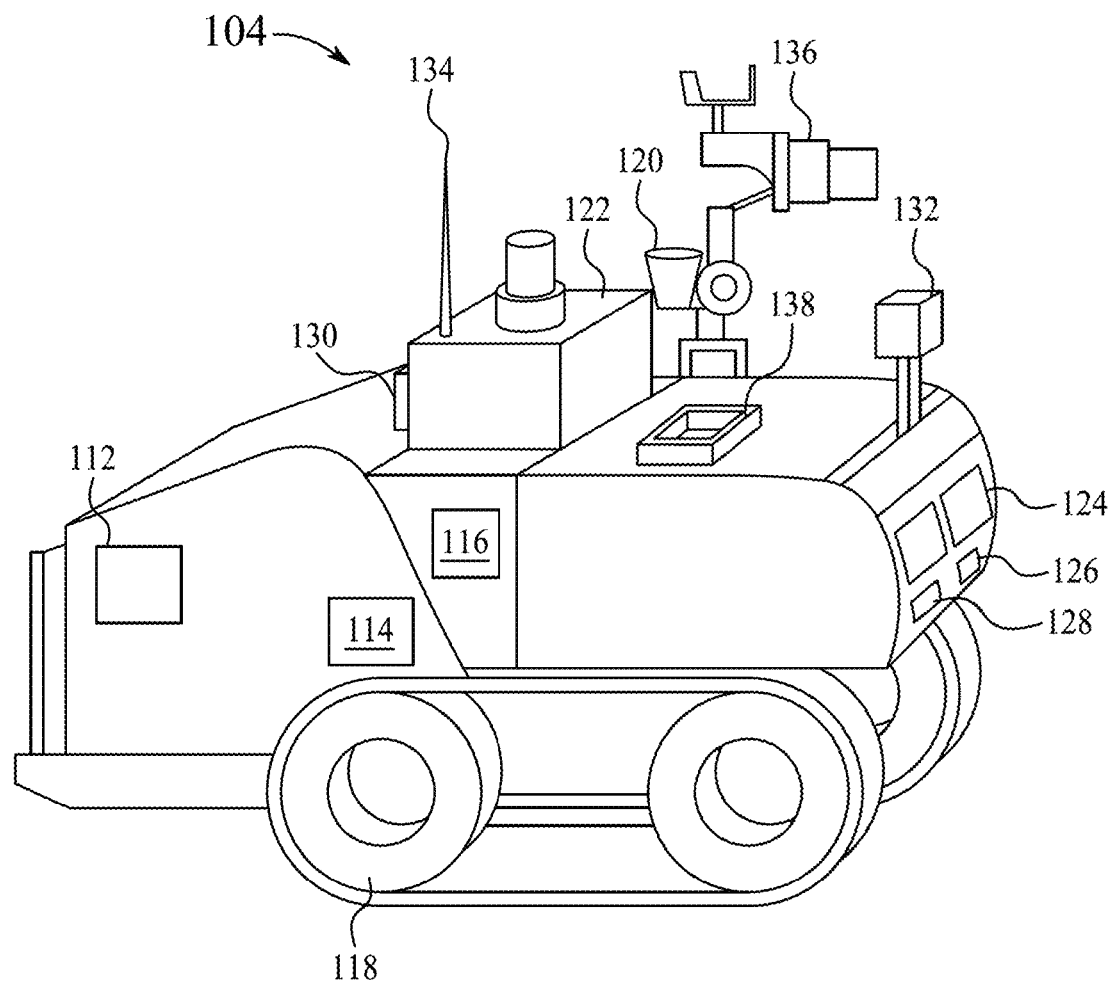
FIG. 1C depicts an example of a mobile wireless agent that can be deployed for a rescue mission, according to certain embodiments.

FIG. 1C depicts an exemplary embodiment of the mobile wireless agent 104 that can be deployed for a rescue mission. The mobile wireless agent 104 may include a power supply 112 (e.g., rechargeable batteries, LiFePO4 batteries, and the like), a controller 114 (e.g., a control system, having microprocessors, internal memory, inputs and outputs (I/O) among other components required on a functional computer, capable of being in communication with a base station to receive the actuation signals required to control peripheral devices mounted on the mobile wireless agent 104, and collect sensory information to be shared with the base station), a wireless communication unit 116 (e.g., a component facilitating wireless communication), a running gear 118 (for example, a gear that induces motion into the mobile wireless agent 104, and which may be replaced with a wheel or tracked chassis, depending on the conditions of the sensing environment), a video surveillance system 120 for capturing a video stream and connected to video transmitter and receiver, an acoustic system 122 including microphones and a voice warning system, a head gear unit 124 with front video camera, an illumination system, wipers and the like, ultrasonic sensors 126 (installed as proximity sensors to be used as an anti-collision safety system), infrared sensors 128 used for imaging, missile guidance, remote sensing, night vision and such, a transmitter and receiver unit 130 for transmitting the collected sensory information and the reception of motion actuation signal from the base station, a sensor unit 132 (e.g., thermal sensors, pressure sensors, gas sensors, proximity sensors, and such) for sensing one or more parameters, a remote control antenna 134 to facilitate remotely controlled operations, a video surveillance antenna 136 for digital broadcasting of compressed video stream and which consists of squaring devices, connected to video transmitter and receiver, a mapping, navigation, and guidance unit 138 for obstacles avoidance and getting information about the terrain to identify possible obstacles on the way and avoid them by changing the route followed by the mobile wireless agent 104.

The sensors implemented on the mobile wireless agent 104 are configured to collect one or more sensory inputs, to be processed by the controller, and to be transmitted to the base station by the mobile wireless agent 104. The mobile wireless agent 104 has communication circuitry, for example transmitting antenna, configured to transmit the sensory information to the base station 102. The base station 102 receives the sensory information and transmits the sensory information to a computing device. The computing device performs processing and computation on the sensory information to produce a motion actuation signal. The base station 102 receives the motion actuation signal from the computing device and transmits the motion actuation signal to the mobile wireless agent 104. The mobile wireless agent 104 receives the motion actuation signals from the base station 102, and communicates with the mapping, navigation, and guidance unit in order to steer the mobile wireless agent 104 through tough and uncertain terrains.

It is noted that the components described with reference to FIG. 1C, are merely exemplary and illustrated with respect to general sensing environment. However, the mobile wireless agent 104 can be equipped with a different combination of components in accordance with other environments. For example, a flooded environment may require a different sensor package than a burning environment.

Figure 2:
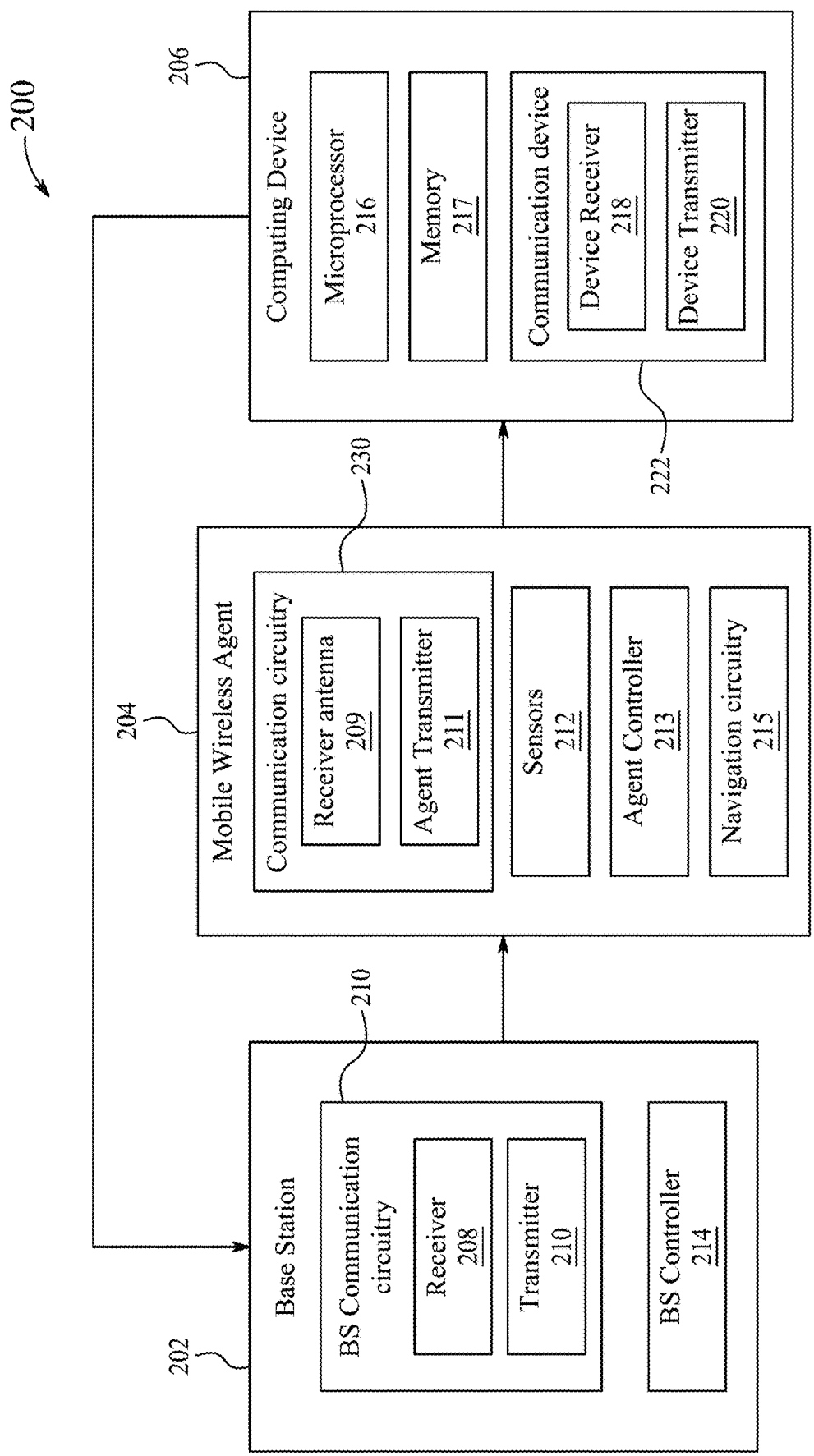
FIG. 2 is a block diagram of circuitry for estimating wireless communication channel characteristics, according to certain embodiments.

FIG. 2 illustrates a block diagram of a system 200 for obtaining estimates of channel characteristics of wireless communications using Rayleigh PDFs, according to certain embodiments. The system 200 is one implementation of the system 100 shown in FIG. 1. The system 200 includes a base station 202, a mobile wireless agent 204, and a computing device 206 interconnected with each other over a wireless communication network. The base station 202 and the mobile wireless agent 204 are implementations of the base station 102 and the mobile wireless agent 104, respectively, of FIG. 1.

The base station 202 may include a core infrastructure dedicated to data computation and data processing, and may include hardware, computer-readable instructions, and a combination thereof, configured to generate one or more signals, for example, motion actuation signals and communication signals. The base station 202 includes, but may be limited to, one or more functional components, such as a BS communication circuitry including a (wireless) receiver 208 and a transmitter 210 for bidirectional wireless communication. The functional components may be controlled by a BS controller 214 to receive the sensory data from the mobile wireless agent 204, send the data to the computing device 206 for data processing, receive the estimated prediction of channel characteristics, and receive or generate motion actuation signals for the mobile wireless agent 204 based on the estimated prediction. The BS controller 214 may include a memory. The BS controller 214 cooperates with the memory to fetch and execute computer-readable instructions stored in the memory. According to an aspect of the present disclosure, the BS controller 214 may be implemented as any of a pecial purpose controller, state machines, logic circuitries, and/or any devices that manipulate signals based on operational instructions.

The BS communication circuitry is implemented to facilitate bidirectional wireless communication, and includes a wireless receiver 208, a wireless transmitter 210, or a transceiver, if combining the wireless receiver 208 and the wireless transmitter 210 in a single unit, as a hardware unit having a receiver antenna and a transmitter antenna, respectively (not shown in the FIG. 2). The receiver antenna of the base station 202 is configured to receive a signal propagated by the agent transmitter 211 of the mobile wireless agent 204, in one example. The transmitter antenna of the base station 202 is configured to propagate a signal towards the receiver antenna of the mobile wireless agent 204, in one example.

In some examples, the base station 202 operates the mobile wireless agent 204 remotely. In some examples, an operator can operate the mobile wireless agent 204 remotely through the base station 202. In an example, the mobile wireless agent 204 may be operated by the base station 202 or by the operator through the base station 202 to perform various tasks, including, but not limited to collecting environmental data through sensors, navigating the mobile wireless agent 204, collecting physical samples, moving objects, manipulating objects, and such tasks.

The mobile wireless agent 204 is configured to receive motion actuation signals and communication signals from the base station 202, use the motion actuation signal to navigate to a physical sensing location, and sense channel characteristics of the communication signals at the physical sensing location, within a sample space, S, given that coordinates of sample points on the sample space, S, are random variables. The mobile wireless agent 204 may be an autonomous mobile agent, such as a robot, in one example.

The mobile wireless agent 204 includes a communication circuitry 230, implemented in FIG. 1C as 130. The communication circuitry 230 includes an agent transmitter 211 and a receiver antenna 209 or a transceiver operable by an agent controller 213 and configured to communicate with the base station 202 and the computing device 206 over a wireless network such that sensory information is transmittable to the computing device 206 and motion actuation signals can be received from the base station 202. The agent controller 213 may be a hardware component having computer-readable instructions implemented to control one or more peripheral devices connected to the mobile wireless agent 204. The agent controller 213 may receive motion actuation signals from the base station 202, and control operating parameters, such as speed, direction, sensory information collection, and such, of the mobile wireless agent 204.

The sensory information is indicative of measurements of one or more environmental or functional parameters, such as light, distance from an obstacle, speed, temperature, etc. The sensory information is captured by a plurality of sensors 212, collectively or individually referred to as sensors 212, mounted on the mobile wireless agent 204. The sensors 212 are controlled by the agent controller 213 to navigate the mobile wireless agent 204 through a cluttered and confined space. The sensors 212 may include numerous types of sensors. The navigation sensors may include, for example, dead reckoning sensors, obstacle detection and avoidance (ODOA) sensors, and simultaneous localization and mapping (SLAM) sensors. Imagery sensors may include a camera for visual identification of features and landmarks within the path. The sensors 212 may further include one or more proximity sensors to determine when an obstacle is close to the mobile wireless agent 204. The proximity sensors may include a laser scanner or a time-of-flight sensor, a volumetric point cloud sensor, a point line sensor, a light detection and ranging sensor, an acoustic sensor, an infrared (IR) sensor, and/or an ultrasonic sensor. The sensors 212 may further include contact sensors to determine when the mobile wireless agent 204 is in physical contact with an object. The contact sensors may include, for example, a bump sensor, a capacitive sensor, an inductance sensor, a Hall Effect sensor, or a switch, or other sensors that generate a signal response to physical displacement. The sensor may further include motion sensors to determine the distance traveled, an amount of rotation, a velocity, and/or an acceleration of the mobile wireless agent 204. The motion sensors may include a wheel odometer, an encoder to measure an amount of rotation of the actuators, an accelerometer, a gyroscope, and/or an inertial measurement unit (IMU). The sensors 212 may further include one or more imaging sensors to capture imagery of the enclosure space. The imaging sensors may include a camera, a visible light camera, etc. The sensors 212 may further include an acoustic sensor, such as a microphone. The acoustic sensor detects acoustic signals in the enclosure space. The sensors 212 may further include a temperature sensor, a moisture sensor, a pressure sensor, and/or an air quality sensor, light sensors, etc. The implementation of the sensors 212 and the combination of sensors is highly subjective to the physical sensing environment of the cluttered confined space, and therefore, one or more sensors 212 can be selected as per the requirement of the physical sensing environment without limitation to the present disclosure. The sensory information collected by the sensors 212 is transmitted to the base station 202, and from the base station 202, the sensory information is transmitted to the computing device 206, where the computing device 206 performs computation on the sensory information and produces the motion actuation signal. The motion actuation signals are then sent to the base station 202. The motion actuation signals may relate to navigation signals, peripheral devices control signals, and such.

The mobile wireless agent 204 includes a navigation circuitry 215 circuitry configured to use the motion actuation signals to navigate to a physical sensing location. In one example, the navigation circuitry 215 may be a GPS module coupled to the agent controller 213. The GPS module may be a satellite-based navigation system that provides location-related information to the controller. The GPS module may include a GPS receiver to receive location-related data from the GPS and provide the location-related data to the controller, where the location-related data is indicative of the physical sensing location of the mobile wireless agent 204.

In an example, the mobile wireless agent 204 may be operated by the base station 202 or by the operator through the base station 202 remotely. The agent controller 213 of the mobile wireless agent 204 includes instructions to receive commands from the base station 202 and execute the commands to perform the various task described above. For example, the mobile wireless agent 204 may be deployed in a bomb diffusion scenario where the bomb may be placed in an engine compartment of a car. The mobile wireless agent 204 may crawl below the car and capture images from various angles and communicate the images to the base station 202. In some examples, the operator through the base station 202 or the base station 202 itself may communicate commands to the mobile wireless agent 204 to capture images at desired angles of the physical sensing environment. The controller 213 of the mobile wireless agent 204 may execute the commands to take the images at the desired angles. The mobile wireless agent 204 may communicate the captured images to the base station 202. The computing device 206 may process the captured images to generate an action plan for the base station 202. Using the action plan, the operator through the base station 202 or the base station 202 itself may communicate commands to the mobile wireless agent 204 to disconnect the electrical connections to the bomb. Accordingly, the mobile wireless agent 204 may disconnect the electrical connection to the bomb by cutting a specific wire. For performing the aforementioned tasks, the state of the communication channels (upstream and downstream channels) transmitting/receiving signals should be known for accurate transmission and reception of sensor signals and images. As a result of the implementations described in the present disclosure, the state of the channels transmitting/receiving the signals is estimated for accurate transmission and reception of sensor signals and images.

The computing device 206 is connected to the base station 202. The computing device 206 may be connected wirelessly from within the base station 202 or from a remote location. The computing device may be wired into the computing facilities of the base station 202 if located within the base station. The computing device 206 may be a separate computer in the base station 202 which connects wirelessly with the computing facilities of the base station 202. The computing device includes a communication device 222 including a device receiver 218 and a device transmitter 220 to establish wireless communication with the mobile wireless agent 204 and the base station 202 from a remote location. The device receiver 218, in one example, may be an antenna to receive the wireless signal containing sensory information from the base station 202. In some aspects of the present disclosure, the computing device may directly receive the sensory information when there is a clear communication channel and available bandwidth. Sensory information collected by the sensors 212 and transmitted by the agent transmitter 211 to the base station 202 may be received by the communication device 222 from the base station 202. The sensory information is then shared with a microprocessor 216 for signal processing and computation. As a result of the computation, a motion actuation signal is generated by the microprocessor 216 and transmitted to the base station 202 by the agent transmitter 211.

The computing device 206, as described earlier, is configured to receive sensory data collected by the mobile wireless agent 204, and to apply the non-linear subspace estimator to estimate wireless channel characteristics. Although the computing device 206 is shown as a separate device connected to the base station 202, the computing device 206 may be implemented as a part of the base station 202. The computing device 206 includes a memory 217 and the microprocessor 216 configured to program a computation process to estimate parameters of the stochastic signals. Microprocessors of the computing device for the execution of program instructions include, by way of an example, both general processors of the type used in computing devices, and a special-purpose processor, shown as the microprocessor 216. The microprocessor 216 is configured to receive instructions and data from a memory 217, which may include a read-only memory and a random-access memory and execute the instructions. Also, the computing device 206 includes, or is operatively coupled to communicate with, one or more mass storage devices for storing data files; such devices include magnetic disks, such as internal hard disks, removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The microprocessor 216 and the memory 214 can be supplemented by, or incorporated in, ASICs (application-specific integrated circuits).

Figure 3A:
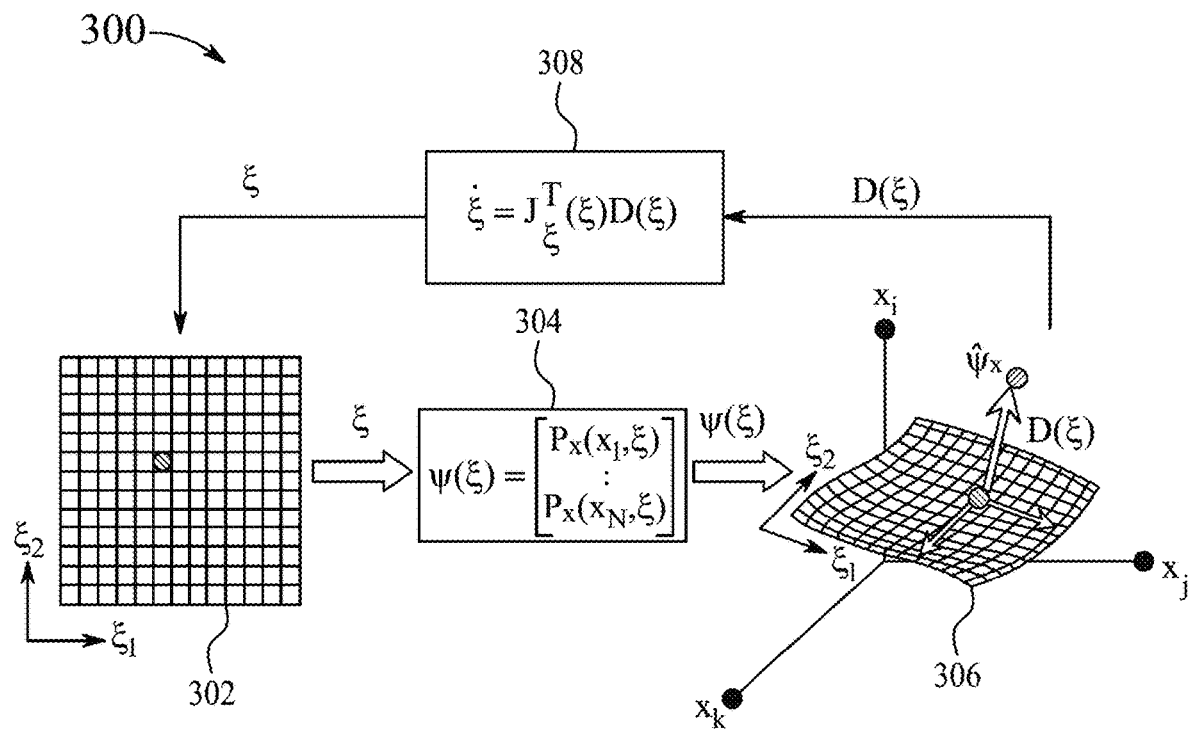
FIG. 3A is a block diagram of a nonlinear subspace estimator, according to certain embodiments.
Figure 3B:
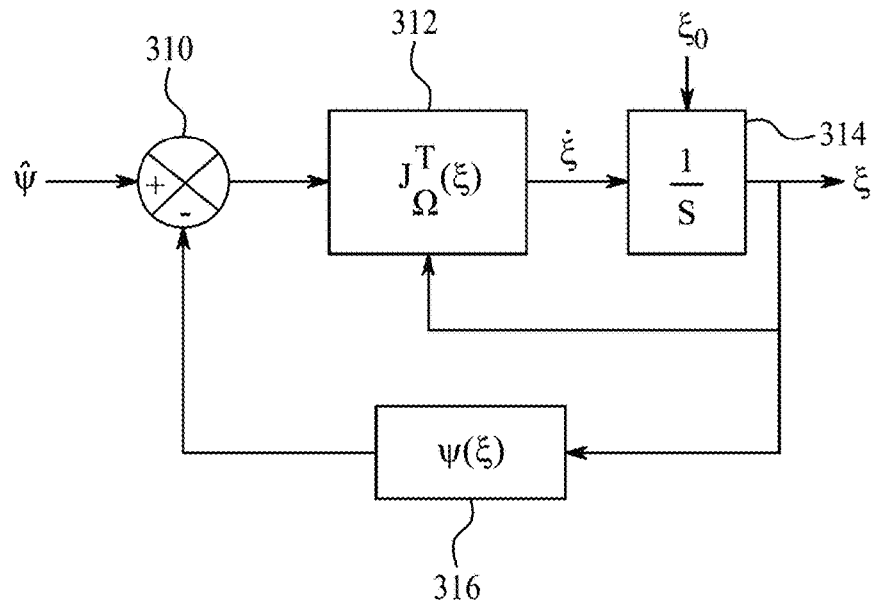
FIG. 3B is a control system diagram of a nonlinear subspace estimator, according to certain embodiments.

FIG. 2 illustrates a physical structure of the system used in gathering the short data records, whereas FIG. 3A and FIG. 3B depict one or more functional components of a system for estimating PDFs to determine parameters of the communication channels used to transfer the data records. FIG. 3A shows a block diagram of a nonlinear subspace system estimator, whereas FIG. 3B shows a control system diagram of the nonlinear subspace system estimator. The system utilizes the nonlinear subspace system estimator for estimating wireless communication channel characteristics based on a Rayleigh distribution represented by a continuous PDF, where Rayleigh PDF characterizes communication channels in heavily cluttered environments.

The mobile wireless agent 204 is configured to receive the motion actuation signals and the communication signals, use the motion actuation signals to navigate to a physical sensing location, and sense channel characteristics of the communications signals at the physical sensing location within a sample space, S, given that coordinates of sample points in the sample space, S, are random variables. The wireless mobile agent collects raw observations of the random phenomenon at the source. The number of observations (source samples) is equal to K.

The computing device 206 is configured to construct a histogram, having N samples, from the channel characteristics. N is a number representative of the amount of data contained in the short data records transmitted between the mobile wireless agent 204 and the base station 202.

The computing device 206 is further configured to construct a set of parameterized Rayleigh probability density functions, PDF, $P_X(x_i, \xi)$, from the N samples of the histogram, where each x represents a set of coordinates in the sample space and $\xi$ is a parameter vector containing a set of L parameters for each x, where i=1, . . . , N. At block 302, a parameter space of the distribution is obtained from the motion actuation. N is a finite number limited by the number of observations, K, that can be made in a finite sampling period. N is in the range of 1 sample to 1000 samples, preferably 1 sample to 100 samples, even more preferably, 1 sample to 50 samples. A lower limit for N can be found from analysis of the probability distribution function $P_X(x_i, \xi)$ described below. For a period, $D_x$, on which $P_X(x_i, \xi)$ is defined, let $W_x$ be the bandwidth of $P_X(x_i, \xi)$, i.e. the highest effective component in the Fourier transform of $P_X(x_i, \xi)$. According to the sampling theorem, the rate of sampling of $P_X(x_i, \xi)$ should be higher than $2W_x$. The lower limit of N is $D_x/2W_x$, i.e., $N > 2D_x W_x$.

In summary, the exact or true probability distribution function $P_X(x_i, \xi)$, which is used as a statistical characterizer of the random signals is described by x which is the random variable that is being observed and a set of parameters that contain L elements $\{\xi_1, \xi_2, \ldots \xi_L\}$. Those parameters control the shape of the probability distribution. The probability distribution must be measured. The measurement of the probability distribution is obtained from the histogram. A histogram may be viewed as the true probability distribution with noise added. As in any process, one cannot take infinite samples of the measurement. The set of samples has to be finite. In this case, we assume that the histogram consists of N samples. The histogram is constructed from the raw observations of the random phenomenon at the source. The number of observations (source samples) is equal to K.

The computing device 206 is further configured to construct a parameterized N-dimensional (N-D) vector function, $\Psi(\xi)$, at block 304, from the set of the parameterized Rayleigh PDFs, $P_X(x_i, \xi)$, where x is a random variable, and $\xi$ is a vector containing the L parameters of the distribution ($\xi = [\xi_1 \ldots \xi_L]^T$). Assuming for the sake of computation that the PDF is represented using its values at a set of samples $\{x_i, i=1, \ldots N\}$, the samples are constructed in conformity with the sampling theorem so that the continuous PDF is uniquely determined from its discrete representation. The samples of the PDF may be used to construct the N-D vector function (1) and may be treated as the coordinates of the sample space S. The components of the parameter vector are also treated as the coordinates of a parameter space A. Consider the subspace $(S_\Lambda)$ which is formed in S as the image of $\Lambda$ under the vector transformation $\Psi(\xi)$, given by equation (1):

$$\Psi(\xi) = \begin{bmatrix} P_X(x_i, \xi) \\ \vdots \\ P_X(x_N, \xi) \end{bmatrix}; \tag{1}$$

The parameters may be selected from any one or more of mean, variance, channel noise, signal to noise ratio, bandwidth, frequency band, component lifetime, and the like, and are dependent on the probability distribution. For example, in a Raleigh distribution, the parameter is variance, and L=1. In the normal distribution, the parameters are mean and variance, and L=2. Generally, L is greater than or equal to one, and less than or equal to three.

In the Rayleigh distribution, the parameter is $\sigma$ and L=1, where $\sigma^2$ is the variance. Therefore, $P_x(x, \sigma) = P_X(x, \sigma) = x/\sigma^2 e^{(-2x^2/\sigma^2)}$ for $x \geq 0$.

In the normal distribution, the parameters are $\sigma$, and mean, $\mu$, where $\sigma^2$ is the variance. Therefore, $P_x(x) = 1/\sigma \sqrt{2\pi} e^{(-(x-\mu)^2/2\sigma^2)}$ The computing device 206 is further configured to form a transformation vector, $\hat{\Psi}$, at block 306, from the histogram for each random variable x. $\hat{\Psi}_x$ is a measurement of the PDF at the sample points $\{x_i, i=1, \ldots N\}$. $\hat{\Psi}_x$ is a vector containing the histogram at the same sample location as $\Psi(\xi)$. The measurement may be decomposed into three components as shown in equation (2).

$$\hat{\Psi}_x = \Psi_x + \Psi_{e_t} + \Psi_{e_n}; \tag{2}$$

where $\Psi_x$ is the correct measurement due to the actual PDF of the random variable, $\Psi_{e_t}$ is the error component that belongs to $S_\Lambda$, and $\Psi_{e_n}$ is the error component that is orthogonal to the subspace $S_\Lambda$. If the estimation process is restricted to operate from within the parameter space with an equivalent effect that propagates to sample space, the effect of $\Psi_{e_n}$ on the estimation process would be nullified and $\Psi_{e_t}$ would be the only source of error. Blind estimation cannot eliminate this error since the blind estimation represents a valid PDF. Only the use of side information in the estimation process can be used to reduce the effect of this error on the estimate. Therefore, an optimal blind processor would select the set of parameters that minimize the distance between the image of the PDF parameters in sample space and the measurement of $\hat{\Psi}_x$. The distance vector translates to minimizing the projection of that distance on $S_\Lambda$.

The computing device 206 is further configured to determine the distance, $D(\xi)$, at block 306 representing an information sample space, between the transformation vector, $\hat{\Psi}$, and the parameterized vector $\Psi(\xi)$ by using equation (3).

$$\min_{\xi} D(\xi) \tag{3}$$

$$D(\xi) = \hat{\Psi} - \hat{\Psi}(\xi);$$

The computing device 206 is further configured to minimize an absolute value of the distance, $D(\xi)$. Typically, the measurement PDF ($\hat{\Psi}_x$) may be obtained from the histogram of the samples of the random variable x. Histograms are used for accurately computing PDFs, provided that a large record of samples is available. Since real-time operation is required, $\hat{\Psi}_x$ is constructed using the largest sample record the situation permits. However, using the largest sample record would cause the measurement to be considerably noisy. The minimization of $|D(\xi)|$ can only be carried-out by minimizing the component that belongs to $S_\Lambda(D_t)$. This component is obtained by performing the dot product between D and a complete set of vectors that are tangent to $S_\Lambda$.

The computing device 206 is further configured to form a Jacobian matrix, $J_\xi$, by calculating a partial derivative of the parameterized vector, $\Psi(\xi)$, for each $\xi$. J is a Jacobian matrix with respect to the parameters of the PDF and is calculated using equation (4). $D_t$ is a component of D that is tangent to $S_\Lambda$.

$$J_\xi = \frac{\partial \Psi(\xi)}{\partial \xi} = \begin{bmatrix} \frac{\partial P_X(x_i, \xi)}{\partial \xi_1} & \cdots & \frac{\partial P_X(x_i, \xi)}{\partial \xi_L} \\ \vdots & \cdots & \vdots \\ \frac{\partial P_X(x_N, \xi)}{\partial \xi_1} & \cdots & \frac{\partial P_X(x_N, \xi)}{\partial \xi_L} \end{bmatrix}, \tag{4}$$

$$D_t = J_\xi^T(\xi) D(\xi);$$

The computing device 206 is further configured to calculate a dot product between a transpose of $J_\xi$ and $D(\xi)$, minimize the dot product, and determine a value of each parameter vector, $\xi$, which minimizes the dot product using equation (5). By choosing $D_t$ as the action that controls the evolution of $\xi$, $D_t$ would converge to zero and $\xi$ would converge to a value that minimizes D.

$$\dot{\xi} = J_\xi^T(\xi) D(\xi); \tag{5}$$

The computing device 206 estimates the parameters of the channel characteristics from each set of L parameters of each $\xi$ using a nonlinear subspace estimator as shown in FIG. 3A. As depicted in FIG. 3A, the parameterized vector, $\Psi(\xi)$, for each $\xi$ within the sample space S is calculated. The distance $D(\xi)$ between the transformation vector $\hat{\Psi}$, and the parameterized vector $\Psi(\xi)$ is calculated based upon $\Psi(\xi)$. The derivative $\dot{\xi}$ of the parameter vector $\xi$ is calculated, at block 308, based upon the distance, $D(\xi)$, between the transformation vector $\hat{\Psi}$ and the parameterized vector $\Psi(\xi)$. In the nonlinear subspace estimator, the Jacobian matrix is calculated which is indicative of the signal stability of the system. Jacobian matrix parameters are then transmitted to the base station 202. The parameter vector $\xi$ is fed back to the parameter space at block 302.

The histogram measurement is mostly noise-free, and thus, the first order dynamical system in equation (5) globally asymptotically converges to the true value of the Rayleigh PDF parameter. Proposition-1 below uses a LaSalle invariance principle to prove asymptotic convergence to the true value of the Rayleigh PDF parameter.

FIG. 3B shows the nonlinear subspace estimator that constructs the measurement PDF ($\hat{\Psi}_x$). A summing point 310 is provided with an input, $\hat{\Psi}$ and the vector transformation $\Psi(\xi)$ as a feedback input signal. At block 312, the Jacobian matrix is calculated which is indicative of signal stability of the system. From the Jacobian matrix, the derivative of $\dot{\xi}$ is calculated. From $\dot{\xi}$ and $\xi(0)$, $\xi$ is determined by integrating at block 314. $\xi$ is then fed back to the Jacoboan matrix at block 312, and is used to construct the vector transformation, $\Psi(\xi)$, at block 316. Construction of each function is described in the subsequent description.

Proposition-1: Consider the Rayleigh distributed random variable shown in equation (6) with parameter $\sigma_0$.

$$P_X(x, \sigma_o) = \frac{X}{\sigma_o^2} \cdot \exp\left(-\frac{x^2}{2 \cdot \sigma_o^2}\right) x \geq 0; \tag{6}$$

If the measurement vector is constructed from chosen samples as per Equation (7), $$\hat{\Psi} = [P_x(x_1, \sigma_o) \ldots P_x(x_N, \sigma_o)]^T; \tag{7}$$

then the first order dynamical system in Equation (5) converges to the true estimate from any initial choice of the parameter.

$$\lim_{t \to \infty} \xi(t) = \sigma_o \forall \xi(0); \tag{8}$$

Considering a norm $V(\xi)$, Lyapunov Function.

$$V(\xi) = \frac{1}{2} D^T(\xi) D(\xi); \tag{9}$$

where V is positive and equals zero when D is zero. Since $\Psi$ uniquely identifies the PDF, the convergence of D to zero implies the convergence of $\xi$ to $\sigma_0$. The time derivative of V is:

$$\dot{V}(\xi) = -D^T(\xi) J(\xi) \dot{\xi}; \tag{10}$$

If the derivative is selected as in Equation (5), then the time derivative is given by:

$$\dot{V}(\xi) = -D^T(\xi) J(\xi) J^T(\xi) D(\xi); \tag{11}$$

The product of a matrix by its transpose, if not positive definite, is at least, positive semi-definite. In other words, the time derivative of the norm, $\dot{V}(\xi)$, is negative semi-definite:

$$\dot{V}(\xi) \leq 0. \tag{12}$$

A set of $\xi$'s for which $\dot{V}(\xi) = 0$ should include, among others, the true value of the parameter (13) given by:

$$\xi \in \Xi = \{\sigma_0 \cup \xi_i, i = 1, \ldots J\}; \tag{13}$$

where $\Xi$ is a set of points at which $\dot{V}(\xi) = 0$.

According to the LaSalle invariance principle, the first order dynamical system of equation (5) converges to the minimum invariance set ($\Omega$). The LaSalle invariance principle is a criterion for the asymptotic stability of an autonomous (possibly nonlinear) dynamical system.

To compute the minimum invariance set ($\Omega$), first the set ($\Delta$) of $\xi$ for which the system of equation (5) is at equilibrium is computed:

$$\Delta = \{\xi : J_\xi^T(\xi) D(\xi) = 0\}; \tag{14}$$

The equilibrium point of the Jacobian matrix is calculated by solving the Rayleigh distribution equation:

$$J_\xi^T(\xi) D(\xi) \approx \alpha \cdot \int_0^\infty \left(\frac{d}{d\xi}\left(\frac{x}{\xi^2} \cdot \exp\left(-\frac{x^2}{2 \cdot \xi^2}\right)\right)\right) \left(\frac{x}{\sigma_o^2} \cdot \exp\left(-\frac{x^2}{2 \cdot \sigma_0^2} - \frac{x}{\xi^2} \cdot \exp\left(-\frac{x^2}{2 \cdot \xi^2}\right)\right)\right) dx; \tag{15}$$

where $\alpha$ is non-zero constant.

Figure 4:
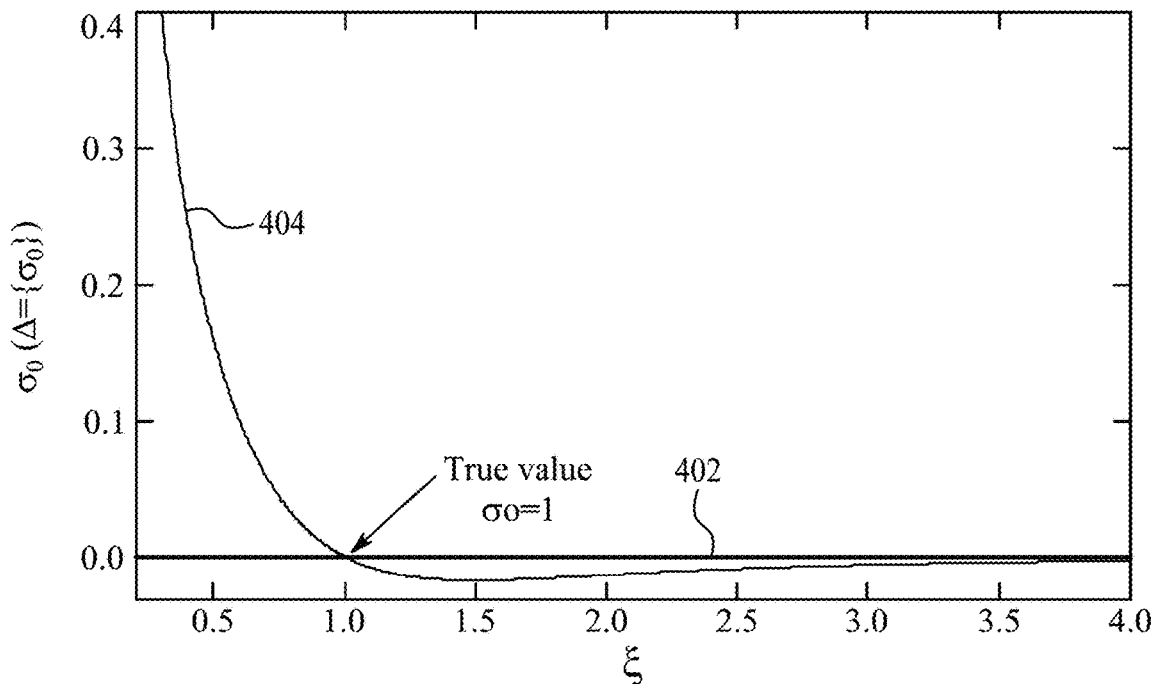
FIG. 4 depicts an equilibrium point of the Rayleigh PDF parameter, according to certain embodiments.

FIG. 4 depicts the equilibrium point of the Rayleigh PDF parameter. Trace 402 illustrates that when $\xi$ is equal to $\sigma_0(\Delta = \{\sigma_0\})$, equation (15) becomes zero. The minimum invariance set which $\xi$ converges to, may be computed with equation (16), and the values are plotted in trace 404.

$$\Omega = \Xi \cap \Delta = \sigma_0; \tag{16}$$

The true value of the equilibrium point, $\sigma_0 = 1$, is achieved at the intersecting point of the traces 402 and 404.

Figure 5:
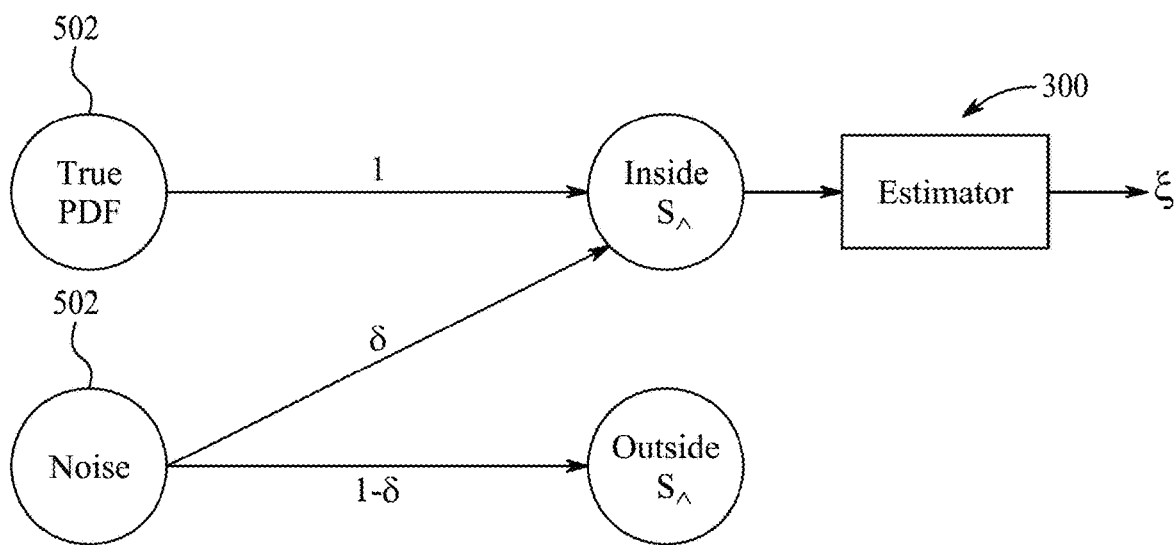
FIG. 5 depicts mapping a true PDF and noise to a nonlinear subspace, according to certain embodiments.

FIG. 5 depicts a mapping of the correct PDF and noise to the nonlinear subspace. While in convergence, when the ideal case is globally asymptotic, the presence of noise in the PDF measurement (histogram) causes the convergence to be local and have a finite set defined by Equation (17).

$$\lim_{t \to \infty} \xi(t) \in |\xi - \sigma_o| < \varepsilon \sigma_{mn}, \xi(0) < \sigma_{mx}; \tag{17}$$

where $0 < \varepsilon << 1$. As shown further, the zone of convergence is by no means restrictive. Here, mn is minimum, and mx refers to maximum, and $\sigma$ is the shape parameter. Equation (17) can accommodate an initial guess of the PDF parameter that is relatively far from the true value.

Instead of a point, convergence to a non-zero measurement set, which is caused by noise, does not impose stringent limitations on the estimator's accuracy. The nature of the convergence makes it possible to easily and practically control the quality of the estimate. This may be concluded by considering two features of the estimation method. First, the true component of the PDF measurement maps with probability 1 to the $S_A$ space while the noise maps to the space with probability $\delta$, as depicted in FIG. 5. Since processing is carried out fully in the parameter space, any noise component of the measurement that lies in the space orthogonal to $S_A$ does not affect the estimate.

Considering $M_S$ as a measure of the sample space S, while $M_{S_A}$ as a measure of the subspace ($S_A$), the dimensionality of S is equal to the number of samples while the dimensionality of $S_A$ is equal to the number of parameters and does not change with changing the number of histogram samples. As a result, $M_S$ increases exponentially with the number of measurement samples while $M_{S_A}$ stays the same. The probability of noise getting mapped into $S_A$ and affecting the estimate considerably diminishes with an increase in number of histogram samples.

The greater the number of random variables used in constructing a histogram, the less noisy is the histogram. The histogram noise is measured by the variance of the mean of the random variables used to construct a histogram sample. This variance is proportional to the inverse of the number of random variables used to construct a sample (K/N). If the number of random variable samples used to construct the histogram is kept constant, the histogram noise would increase with N.

As can be seen, the increase in noise caused by fixing the value of K and increasing N may be counteracted by an enhanced noise rejection capability of the subspace. Unless K is very small, the impact of noise on the quality of the estimate can be effectively managed by increasing N. The simulation results are discussed in subsequent paragraphs.

The following examples are provided to illustrate further and to facilitate the understanding of the present disclosure.

In an experiment conducted using the methods of the present disclosure, the effect of the number of histogram samples and the number of random variable samples on the quality of the estimate were tested. Further, the sensitivity of the method to the value of the PDF's parameter, the convergence interval, and the number of iterations needed for convergence was also tested. The convergence interval in which the initial condition of the parameter must lie in ($\xi(0)_\in\{\sigma_{mn}, \sigma_{mx}\}$) was determined experimentally.

Figure 6A:
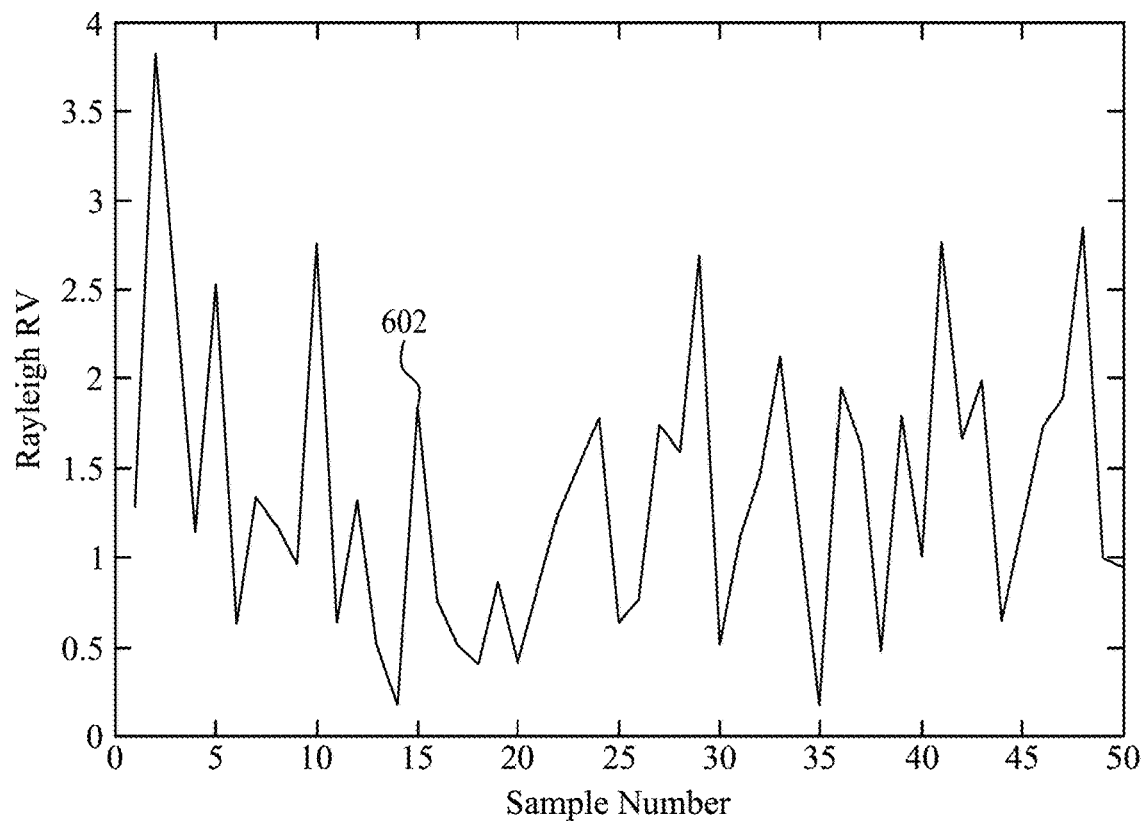
FIG. 6A is a graph of Rayleigh random variables (RV), at (K=50, $\sigma_o$=1), versus sample number, according to certain embodiments.
Figure 6B:
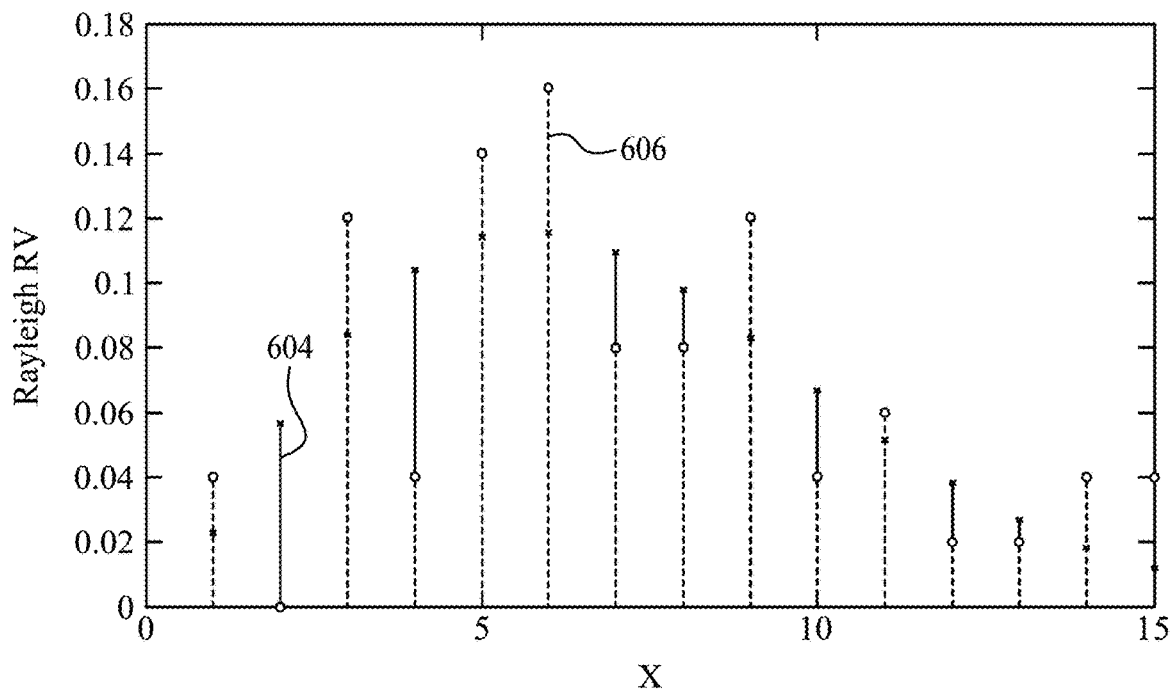
FIG. 6B is a histogram of Rayleigh random variables (RV) versus estimated PDFs and true PDFs, at (K=50, $\sigma_o$=1), according to certain embodiments.
Figure 7:
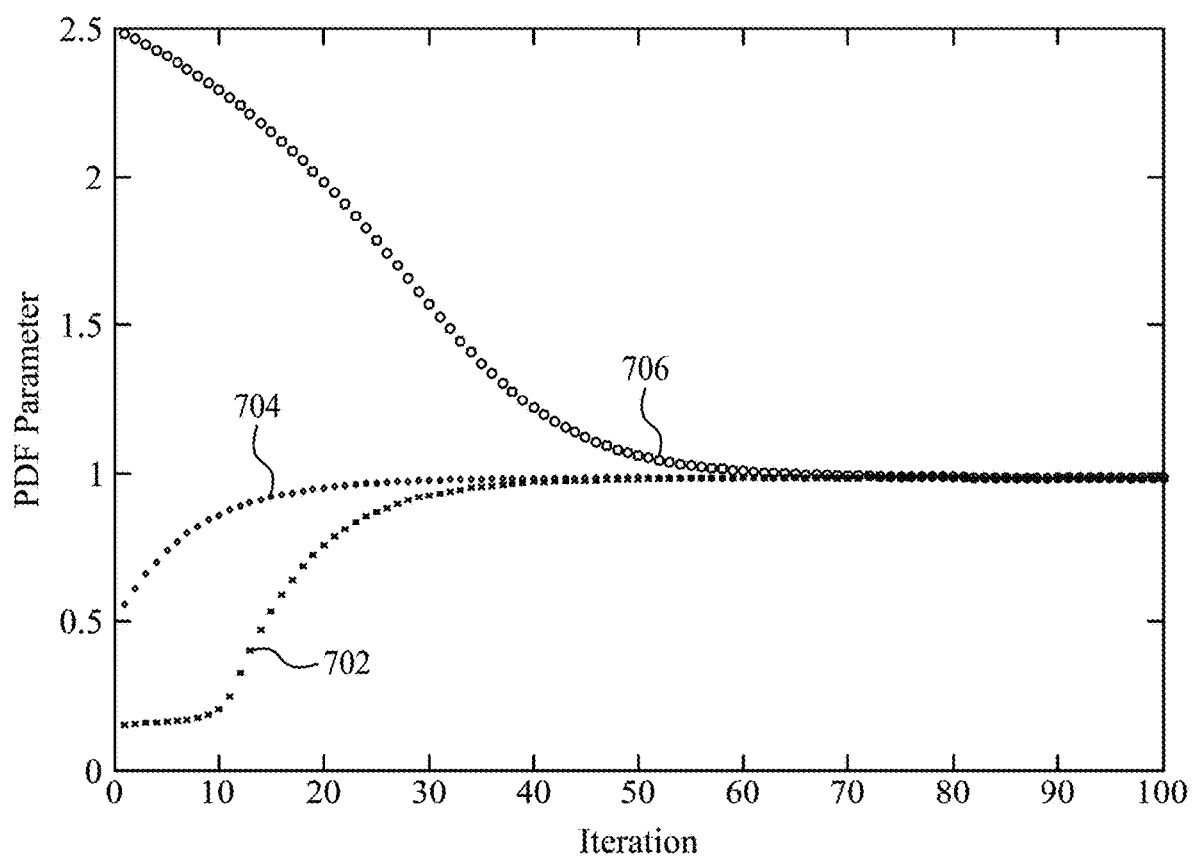
FIG. 7 is estimated evolution of initial PDF parameter values, at (K=50, $\sigma_o$=1) versus iteration number, according to certain embodiments.

FIG. 6A is a graph of Rayleigh RVs for K=50, $\sigma_o$=1 versus sample number. In a first example, a low number of random variable samples was used (K=50). Sample values, X, were plotted against Rayleigh random variables, as depicted by race 602. FIG. 6B is a histogram of Rayleigh random variable (RV) versus estimated PDFs and true PDFs, at (K=50, $\sigma_o$=1). The measurement of the PDF was constructed using 15 histogram samples only (N=15), and a low value for the parameter was selected ($\sigma_o$=1). The values were plotted on the graph, and are depicted by traces 604 and 606. The parameters of the trial are shown in table 1a. The estimator was initialized with three values. Among three, two were close to the boundary of the convergence interval (0.5 and 0.15), and one was close to the true value (2.5). The results are shown in table-1b. FIG. 7 depicts the estimated evolution of initial PDF parameter values, at (K=50, $\sigma_o$=1) as depicted by traces 702, 704, and 706, for $\xi(0)$=0.5, 0.15, and 2.5, respectively, over successive iterations. The evolution traces for the estimates from all the initial values, as shown in FIG. 7, were converged, using a small number of iterations, to the same estimate. Despite the low number of random variable samples used, a high accuracy of the estimate was observed.

TABLE-1A

Parameters of the estimator

| $\sigma_o$ | K | N | $\sigma_{mx}$ | $\sigma_{mn}$ |
|---|---|---|---|---|
| 1 | 50 | 15 | 2.5 | 0.1 |

TABLE-1B

Estimator results corresponding to parameters in table-1a

| $\xi(0)$ | Iterations | $\sigma_{est}$ | Err % |
|---|---|---|---|
| 2.5 | 65 | 0.986 | 1.4% |
| E0.5 | 35 | 0.986 | 1.4% |
| 0.15 | 43 | 0.986 | 1.4% |

The following example depicts the increase in the value of the true parameter of the PDF (table-2a), as compared to the values shown in FIG. 6A to FIG. 7. As can be seen from the results (table-2b, FIG. 8A, 8B, and FIG. 9), the characteristics of the estimator did not change, except that the speed of convergence and the accuracy deteriorated a little.

Figure 8A:
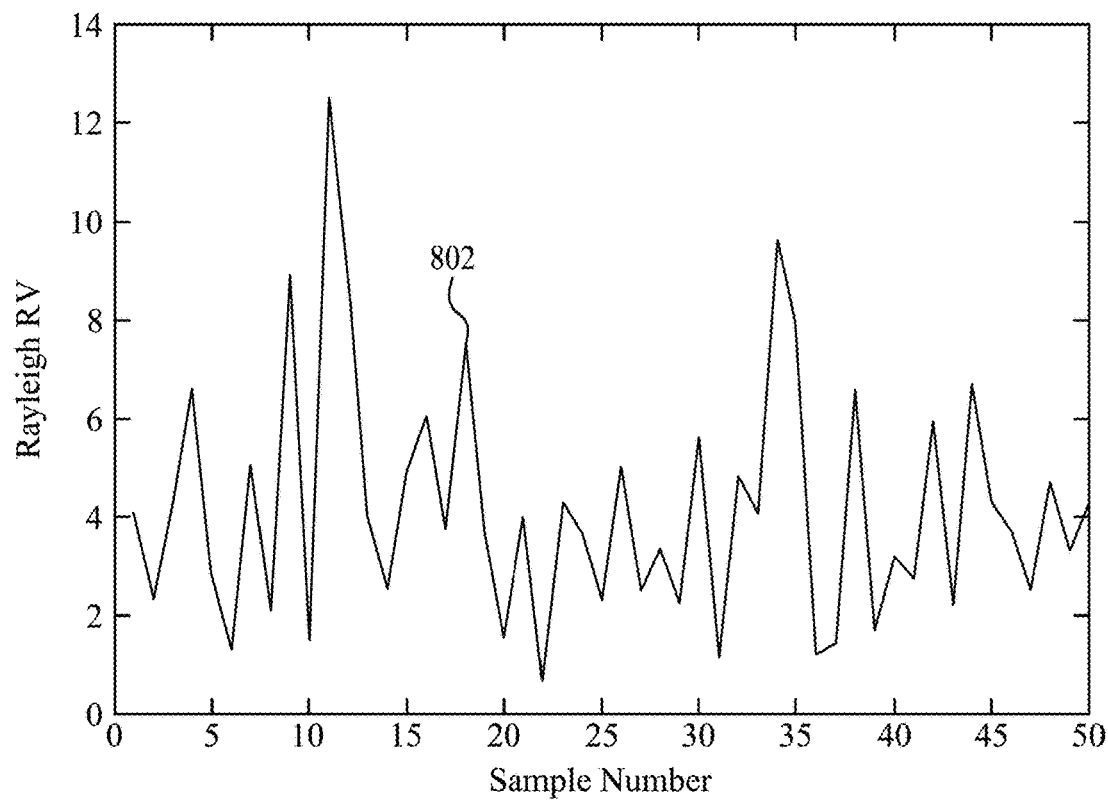
FIG. 8A is a graph of Rayleigh RV, at (K=50, $\sigma_o$=4), versus sample number, according to certain embodiments.

FIG. 8A is a graph of the Rayleigh RV, at (K=50, $\sigma_o$=4), versus sample number. A low number of random variable samples was used (K=50). Sample values were plotted against Rayleigh random variables, as depicted by trace 802 of FIG. 8A.

Figure 8B:
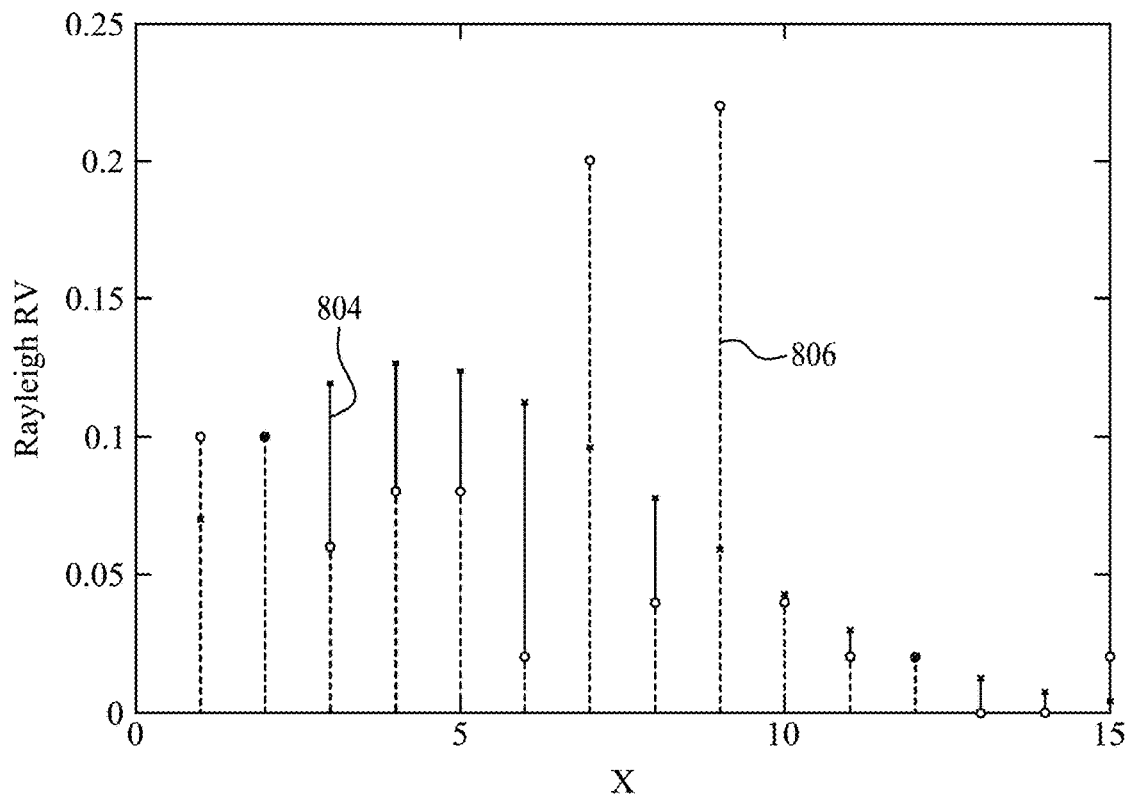
FIG. 8B is a histogram of Rayleigh RV versus estimated PDFs and true PDFs, at (K=50, $\sigma_o$=4), according to certain embodiments.

FIG. 8B is a histogram of Rayleigh RV for estimated PDFs and true PDFs, at (K=50, $\sigma_o$=4), versus sample value, X. The measurement of the PDF constructed used only 15 histogram samples (N=15), and a low value for the parameter was selected ($\sigma_o$=4). The values are plotted on the histogram, and depicted by traces 804 and 806.

Figure 9:
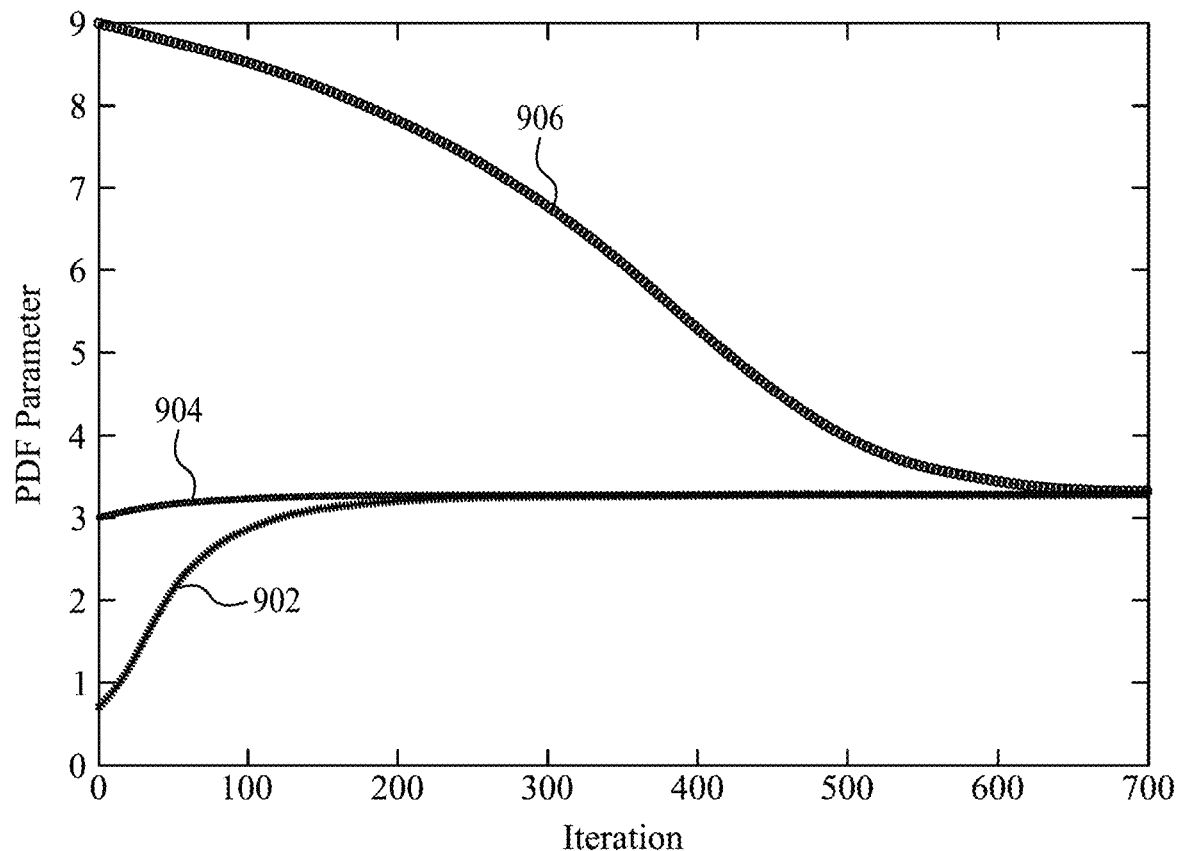
FIG. 9 is estimated evolution of initial PDF parameter values, at (K=50, $\sigma_o$=4) versus iteration number, according to certain embodiments.

FIG. 9 shows the estimated evolution of initial PDF parameter values, at (K=50, $\sigma_o$=4) over successive iterations as depicted by traces 902, 904, and 906, for $\xi(0)$=0.7, 3, and 9, respectively.

TABLE-2A

Parameters of the estimator

| $\sigma_o$ | K | N | $\sigma_{mx}$ | $\sigma_{mn}$ |
|---|---|---|---|---|
| 4 | 50 | 15 | 10 | 0.5 |

TABLE-2B

Estimator results corresponding to parameters in table-2a

| $\xi(0)$ | Iterations | $\sigma_{est}$ | Err % |
|---|---|---|---|
| 9 | 800 | 3.279 | 18% |
| 3 | 130 | 3.277 | 18% |
| 0.7 | 240 | 3.277 | 18% |

The two previous examples were repeated for $\sigma_o$=1 (Table-3a and table 3b, FIG. 10A, 10B, and FIG. 11) and for $\sigma_o$=4 (Table-4a,b, FIG. 12A, 12B, and FIG. 13) with the number of random variable samples increased to K=500. The general behavior of the estimator remained the same, the accuracy of the estimate increased, especially for higher values of the PDF parameter, and the number of iterations remained practically unaffected.

Figure 10A:
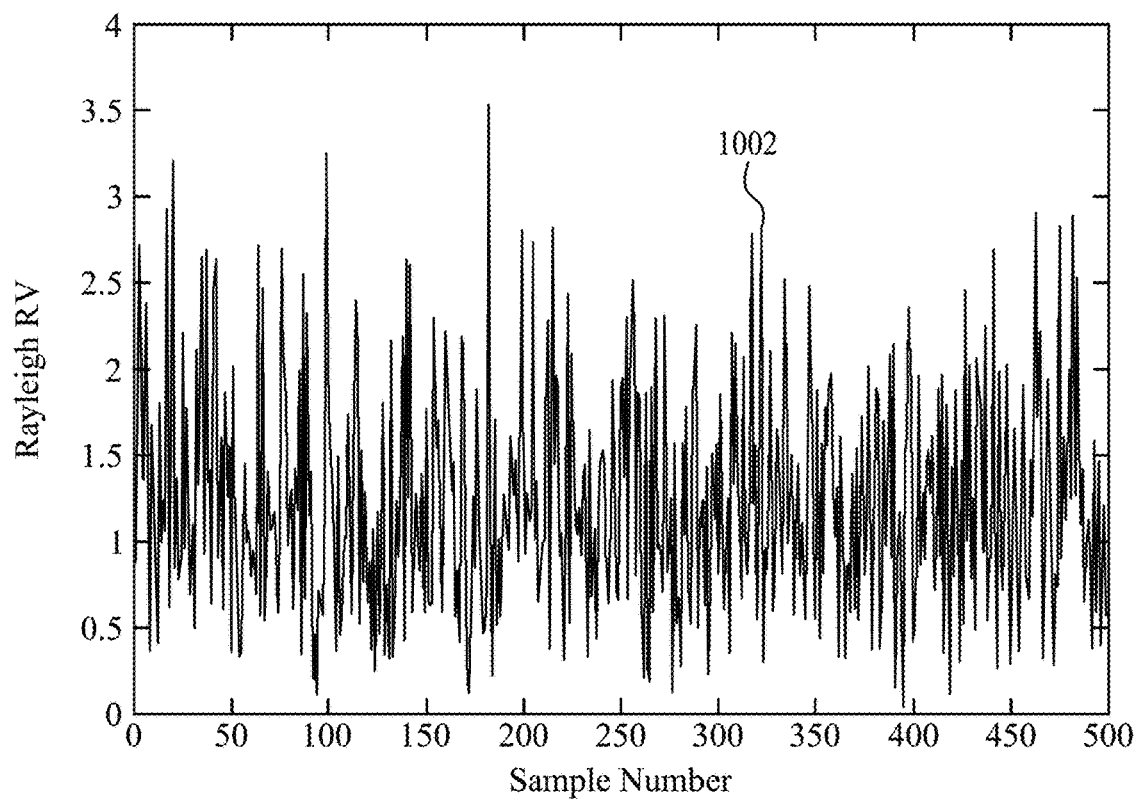
FIG. 10A is a graph of Rayleigh RV, at (K=500, $\sigma_o$=1), versus sample numbers, according to certain embodiments.

FIG. 10A is a graph of Rayleigh RV, at (K=500, $\sigma_o$=1), versus sample number. A number of random variable samples was used (K=500). Sample values are plotted against Rayleigh random variables, as depicted by a trace 1002 of FIG. 10A.

Figure 10B:
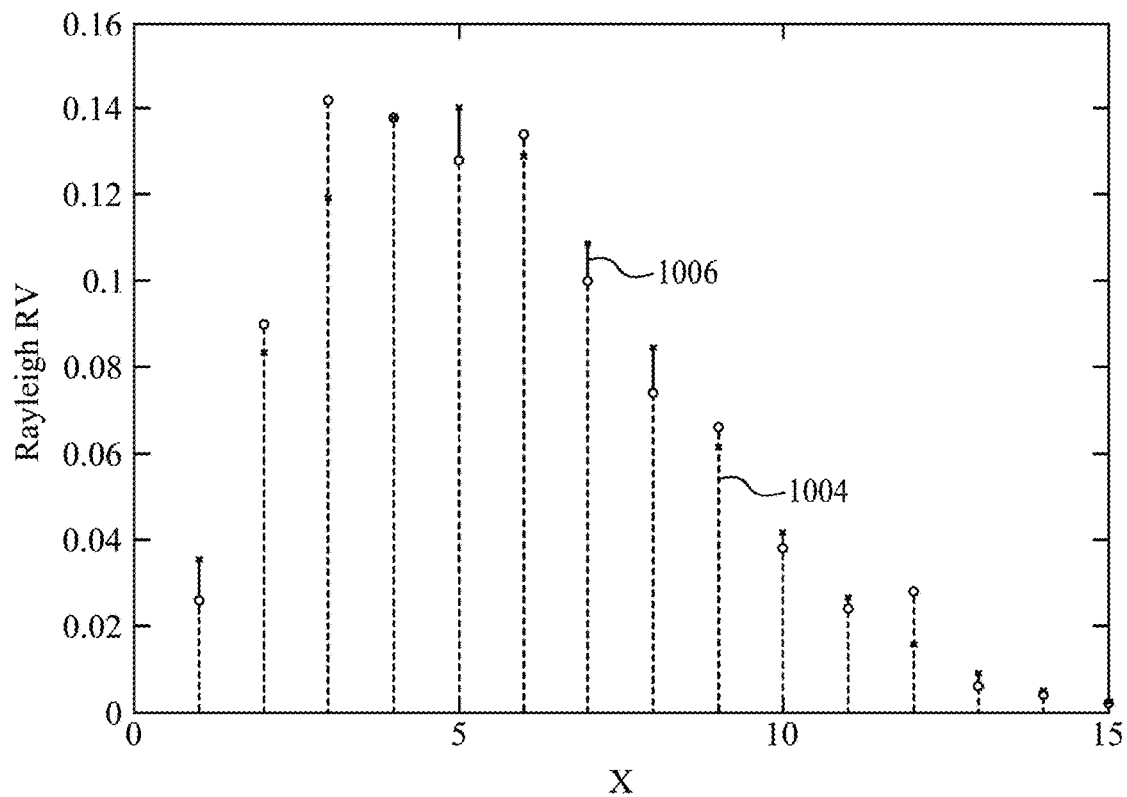
FIG. 10B is a histogram of Rayleigh RV versus estimated PDFs and true PDFs, at (K=500, $\sigma_o$=1), according to certain embodiments.

FIG. 10B is a histogram of Rayleigh RV versus estimated PDFs and true PDFs, at (K=500, $\sigma_o$=1) versus sample value, X. The measurement of the PDF constructed used only 15 histogram samples (N=15), and a low value for the parameter was selected ($\sigma_o$=1). The values are plotted on the graph, and depicted by traces 1004 and 1006.

Figure 11:
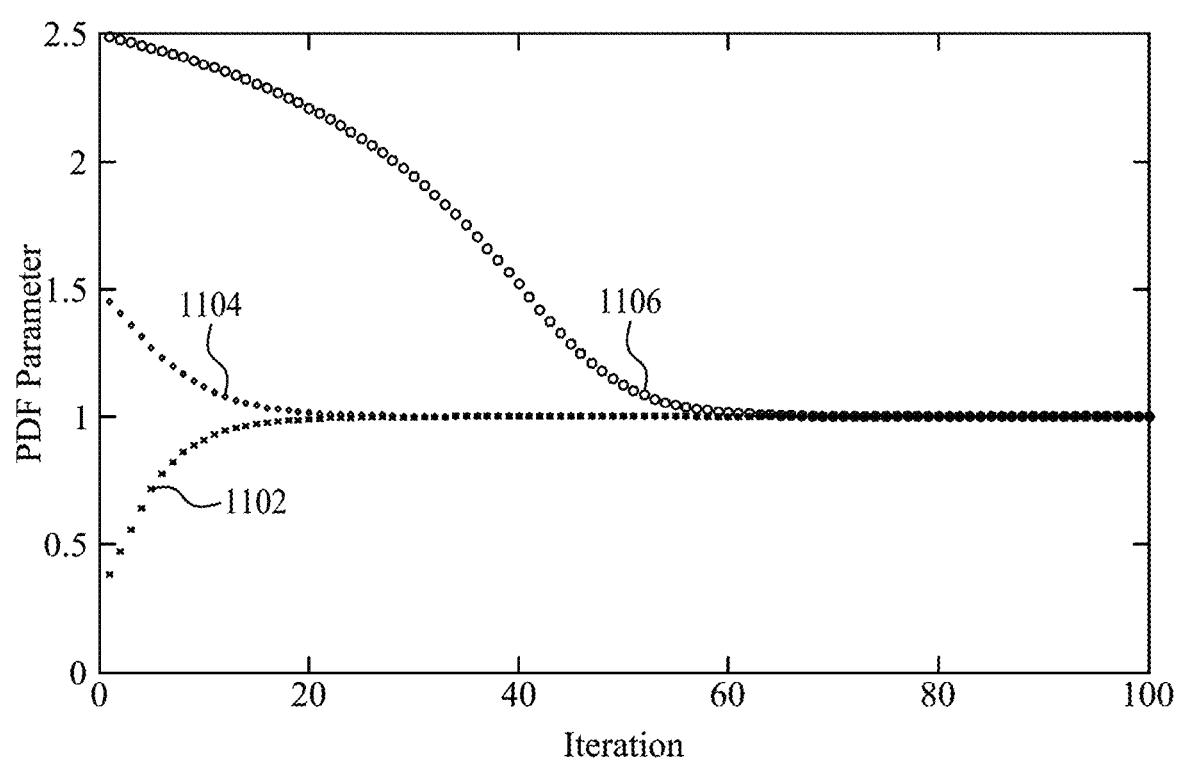
FIG. 11 is estimated evolution of initial PDF parameter values, at (K=500, $\sigma_o$=1), according to certain embodiments.

FIG. 11 illustrates the estimated evolution of initial PDF parameter values, at (K=500, $\sigma_o$=1), over successive iterations, as depicted by traces 1102, 1104, and 1106, for ξ(0)=0.3, 1.5, and 2.5, respectively.

TABLE-3A

Parameters of the estimator

| $\sigma_o$ | K | N | $\sigma_{mx}$ | $\sigma_{mn}$ |
|---|---|---|---|---|
| 1 | 500 | 15 | 2.9 | 0.17 |

TABLE-3B

Estimator results corresponding to parameters in table-3a

| ξ(0) | Iterations | $\sigma_{est}$ | Err % |
|---|---|---|---|
| 2.5 | 70 | 0.998 | 0.2% |
| 1.5 | 25 | 0.998 | 0.2% |
| .3 | 25 | 0.998 | 0.2% |

Figure 12A:
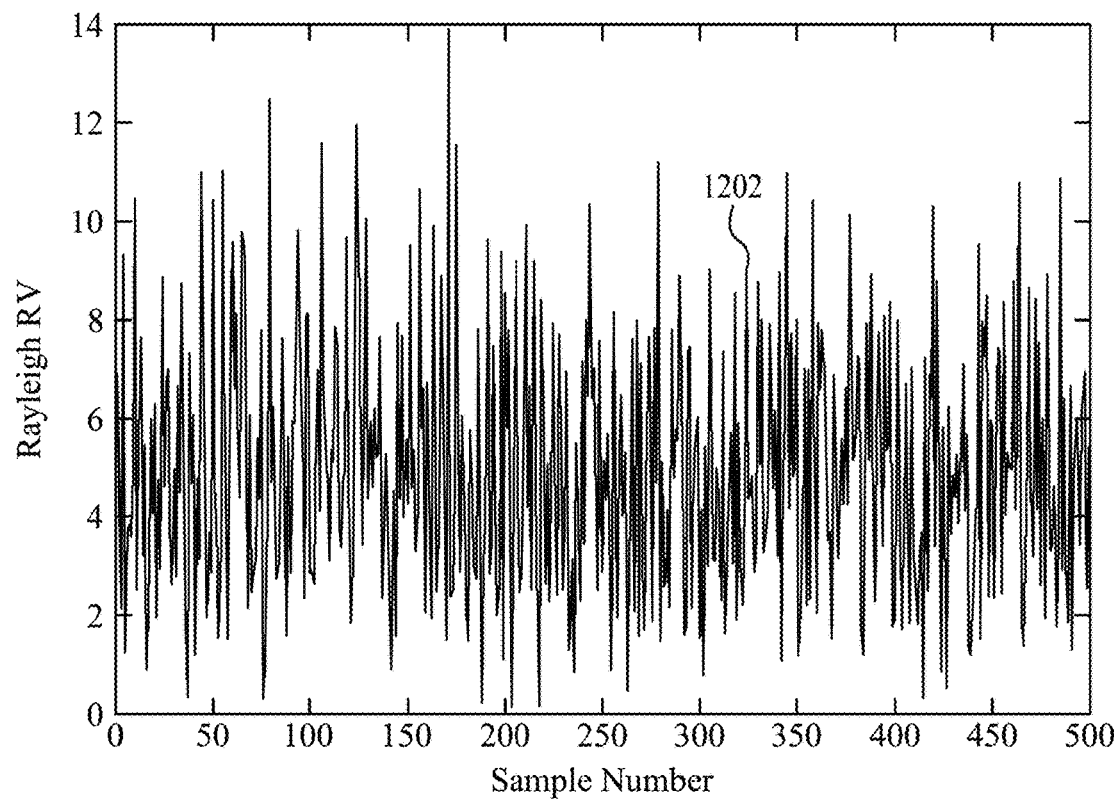
FIG. 12A is a graph of Rayleigh RV, at (K=500, $\sigma_o$=4), versus sample numbers, according to certain embodiments.

FIG. 12A is a graph of Rayleigh RV, at (K=500, $\sigma_o$=4), versus sample numbers. A number of random variable samples was used (K=500). Sample numbers are plotted against Rayleigh random variables, as depicted by trace 1202 in FIG. 12A.

Figure 12B:
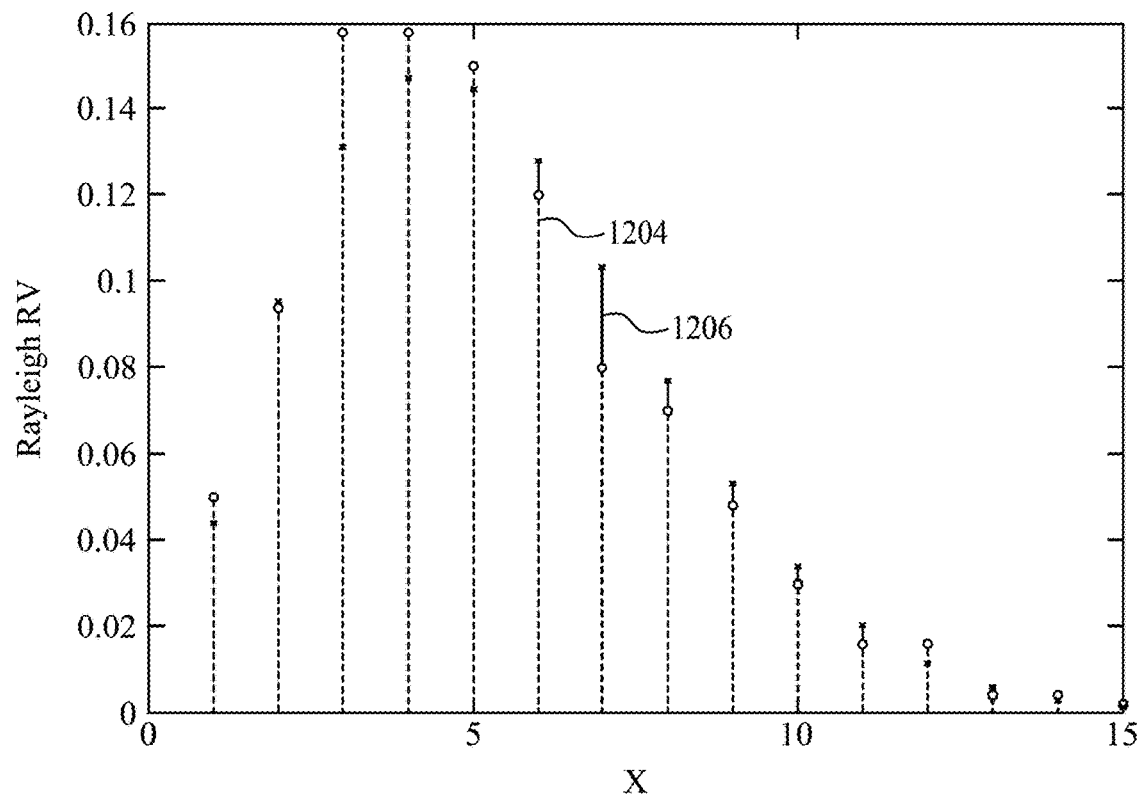
FIG. 12B is a histogram of Rayleigh RV versus estimated PDFs and true PDFs, at (K=500, $\sigma_o$=4), according to certain embodiments.

FIG. 12B is a histogram of Rayleigh RV versus estimated PDFs and true PDFs, at (K=500, $\sigma_o$=4) versus sample value, X. The measurement of the PDF was constructed using only 15 histogram samples (N=15), and a low value for the parameter was selected ($\sigma_o$=4). The values are plotted on the graph, and depicted by traces 1204 and 1206, in FIG. 12B.

Figure 13:
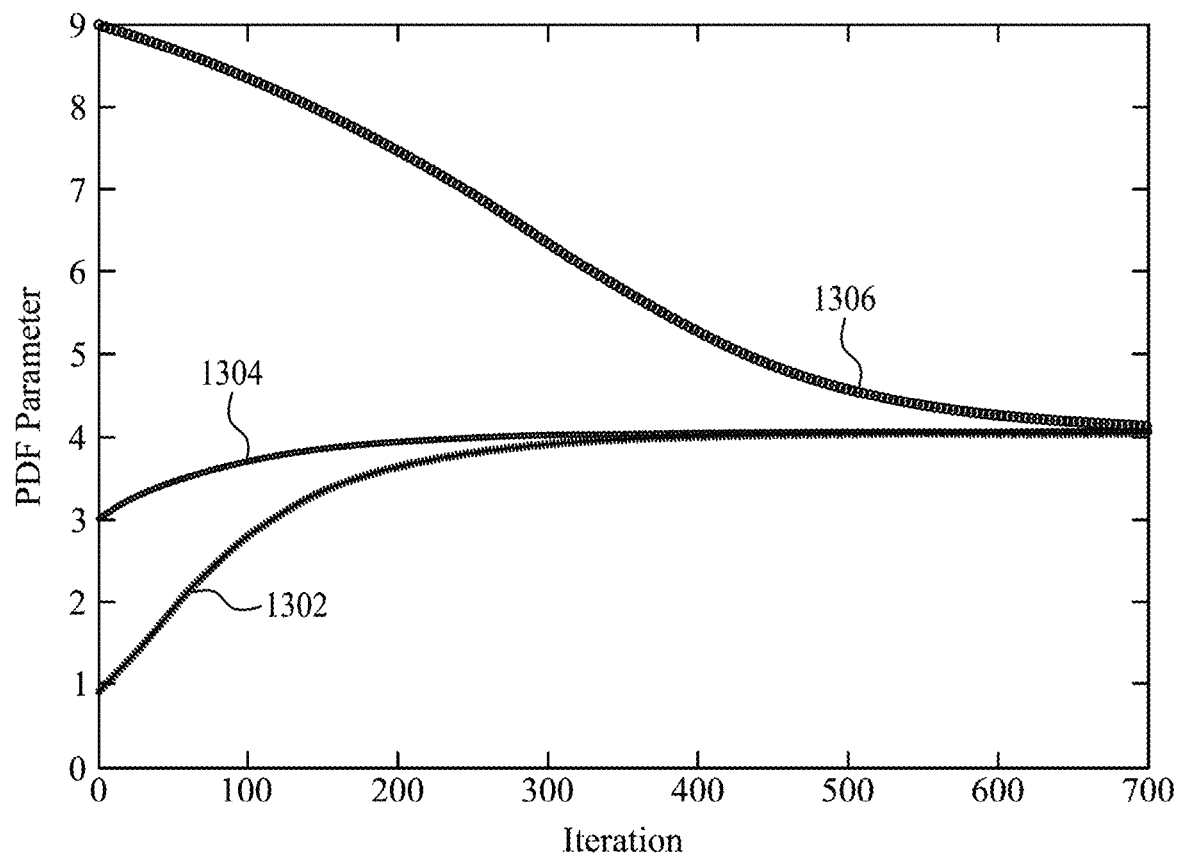
FIG. 13 is estimated evolution of initial PDF parameter values, at (K=500, $\sigma_o$=4) versus iteration number, according to certain embodiments.

FIG. 13 illustrates the estimated evolution of the initial PDF parameter values, at (K=500, $\sigma_o$=4) over successive iterations, as depicted by traces 1302, 1304, and 1306, for ξ(0)=0.9, 3, and 9, respectively.

TABLE-4A

Parameters of the estimator

| $\sigma_o$ | K | N | $\sigma_{mx}$ | $\sigma_{mn}$ |
|---|---|---|---|---|
| 4 | 500 | 15 | 19 | 0.6 |

TABLE-4B

Estimator results corresponding to parameters in table-4a

| ξ(0) | Iterations | $\sigma_{est}$ | Err % |
|---|---|---|---|
| 9 | 800 | 4.070 | 1.4% |
| 3 | 250 | 4.052 | 1.3% |
| .9 | 350 | 4.051 | 1.3% |

Figure 14:
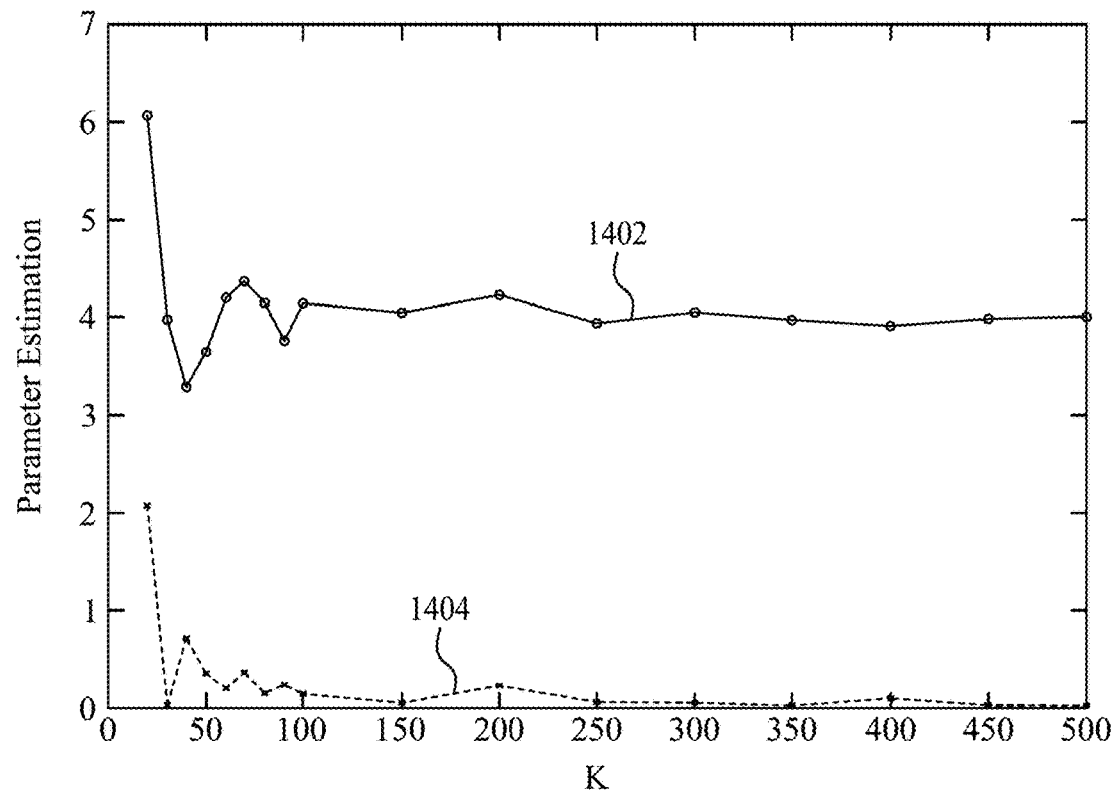
FIG. 14 depicts a graph of estimate convergence versus number of random variable (RV) samples, according to certain embodiments.

FIG. 14 depicts estimated convergence versus the number of random variable (RV) samples, K. The effect of the number of random variable samples, K, on estimate accuracy is tested for the case N=15 and $\sigma_o$=4. Rapid convergence to the correct estimate was observed as a function of K with no noticeable improvement in accuracy for K>100. FIG. 14 shows parameter estimates 1402 and errors 1404.

Figure 15:
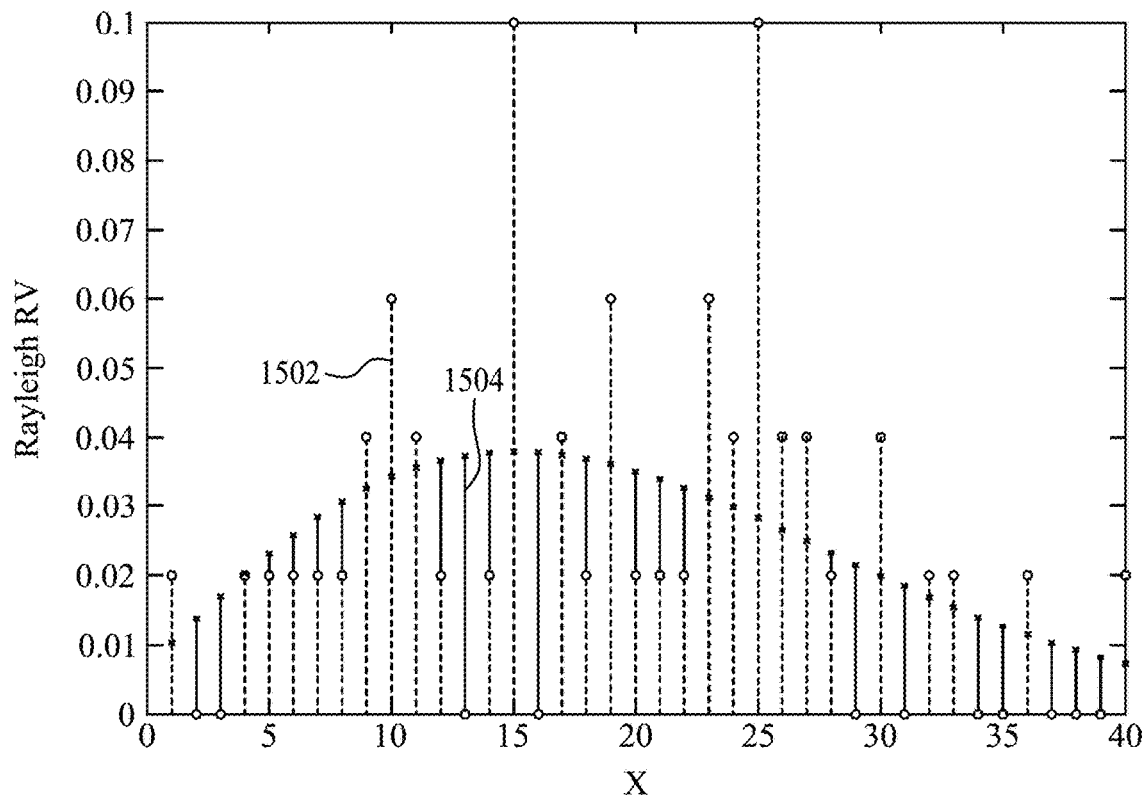
FIG. 15 is a histogram of Rayleigh RV versus estimated PDFs and true PDFs for (K=40, N=50 and $\sigma_o$=4), according to certain embodiments.

FIG. 15 is a histogram of Rayleigh RV versus estimated PDFs and true PDFs for (K=40, N=50 and $\sigma_o$=4), versus sample value, X, where the high distortion in the measurement of the PDF is obvious. The histogram is depicted by a trace 1502, and true PDF values are depicted by true PDF traces 1504.

Figure 16:
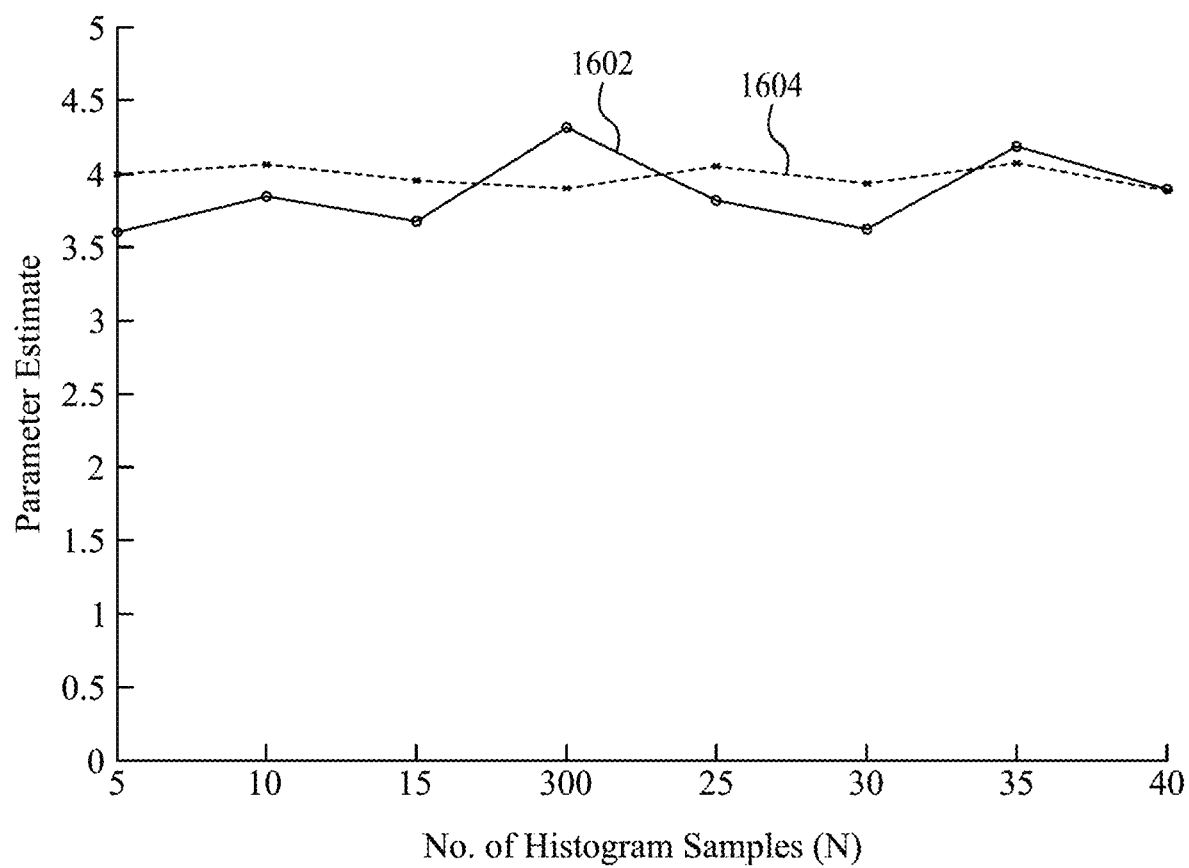
FIG. 16 is a graph of estimated parameters versus number of histogram samples (N) for constant K, according to certain embodiments.

In FIG. 16 is a graph of the parameter estimate versus the number of histogram samples (N) for constant K. The flat profile of the parameter estimate as a function of K for both low and high number of RVs is depicted. As mentioned above, increasing N while keeping K constant increased the noise in the measurement. Although the fluctuation (variance) in the estimate was relatively high for the low number of RVs and was low for the high number of RVs, both estimates were observed to be around a constant that is equal to the true value of the estimate. Parameter estimate values for K=50 are depicted by trace 1602, and parameter estimate values for K=500 are depicted by trace 1604.

Figure 17A:
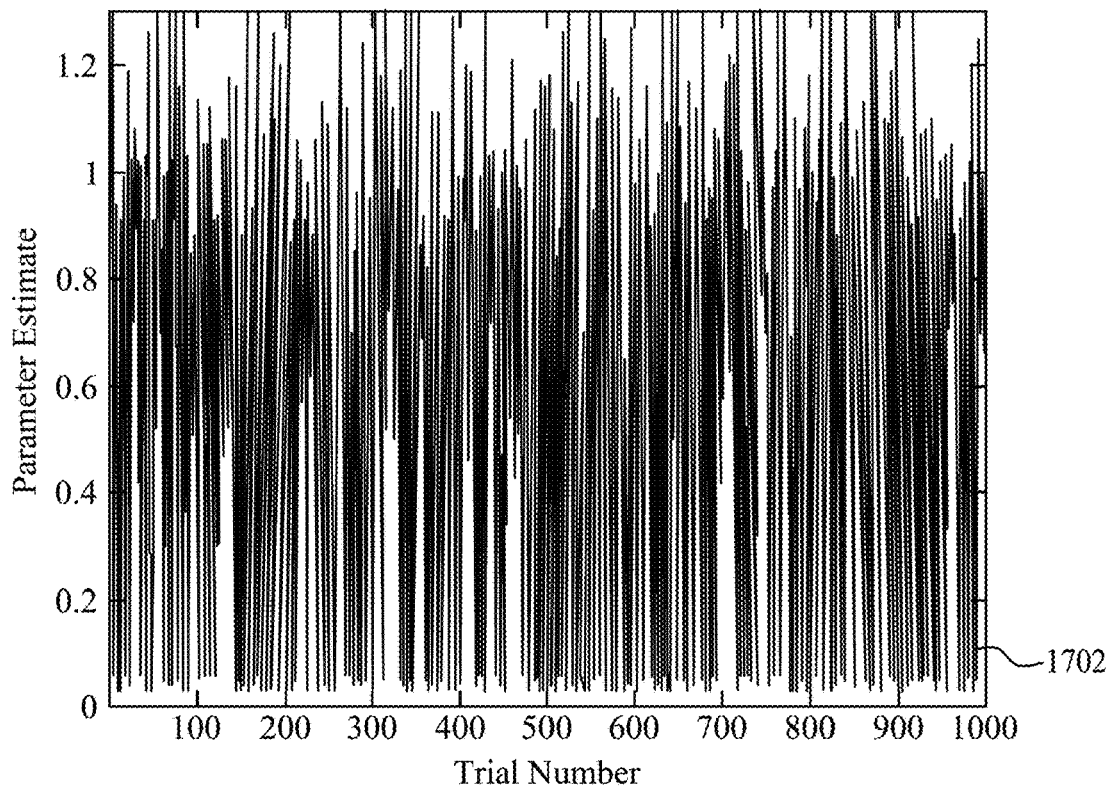
FIG. 17A depicts a result of consecutive trials of Rayleigh parameter estimates conducted using direct norm minimization for K=30, according to certain embodiments.

FIG. 17A depicts data collected during 1000 consecutive trials of Rayleigh parameter estimates using direct norm minimization, having K=30. The direct norm minimization is a technique of channel characteristics estimation, and is performed by using convex optimization tools. The direct norm minimization is applied to obtain sequential channel characteristics estimation.

Trace 1702 illustrates rapid and large fluctuations in values. The values are virtually uncorrelated with no significant influence of the expected value on the estimate.

Figure 17B:
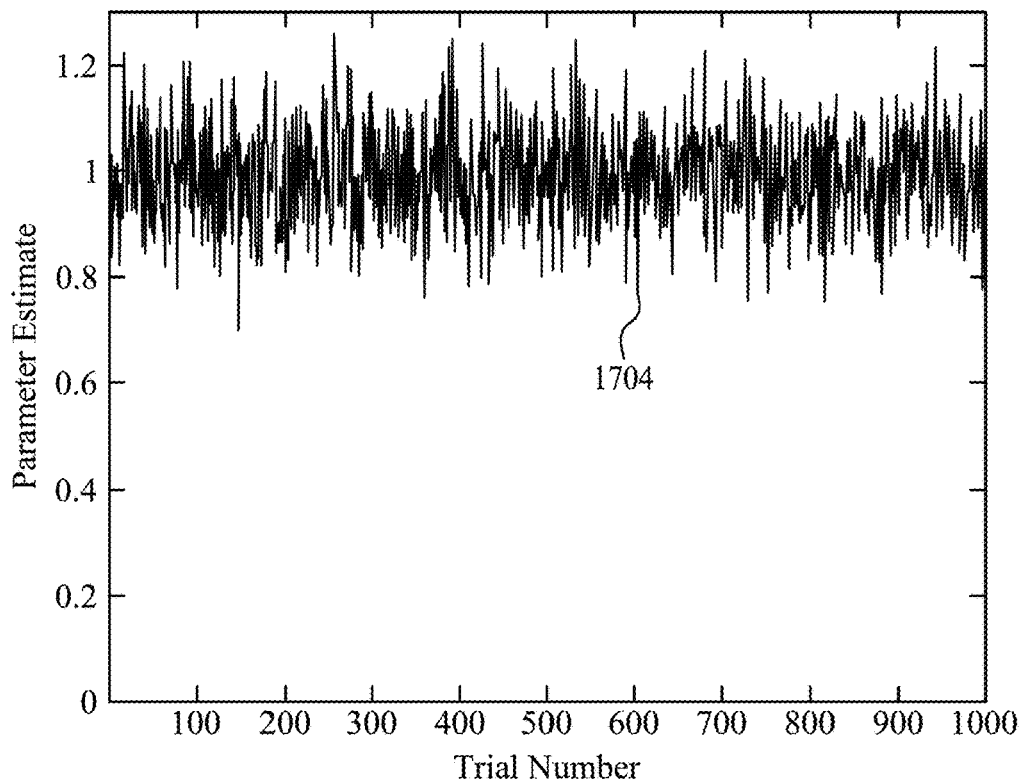
FIG. 17B depicts a result of consecutive trials of Rayleigh parameter estimates conducted using a suggested subspace method, K=30, according to certain embodiments.

FIG. 17B depicts data collected during 1000 consecutive trials of Rayleigh parameter estimates using the subspace estimation, having K-30. Unlike the results of estimation by direct norm minimization, trace 17B illustrates the fluctuation in a narrow band around the expected value.

Table 5 compares values of variance and mean obtained by subspace estimation and L-2 direct norm minimization. Column "subspace" indicates the subspace estimation, and column "L2-norm" indicates direct norm minimization, having N=15.

| | Subspace | | L2-Norm | |
|---|---|---|---|---|
| K | Variance | Mean | Variance | Mean |
| 30 | 0.017 | 0.9956 | 0.0862 | .7660 |
| 50 | 0.0077 | 0.9949 | 0.0296 | 0.9243 |
| 100 | 0.0029 | 0.9944 | 0.0092 | 0.9905 |
| 200 | 0.0015 | 0.9963 | 0.0042 | 1.0198 |
| 300 | 0.000973 | 1.0008 | 0.0030 | 1.0265 |
| 400 | 0.000742 | 0.9998 | 0.0022 | 1.0267 |
| 500 | 0.00057 | 1.0000 | 0.0017 | 1.0315 |
| 600 | 0.000526 | 1.0003 | 0.0016 | 1.0320 |

Table 5. Rayleigh parameter estimates using the subspace method and by direct norm minimization (N=15).

In addition to direct norm minimization, the subspace estimation is compared to other Rayleigh parameter estimators including closed forms and non-closed forms. The closed form parametric estimators include a maximum likelihood estimator (MLE), the Bayes estimator, and a moment estimator.

$$\hat{\sigma} = \frac{4^K \cdot K!(K-1)!\sqrt{K}}{(2K)!\sqrt{\pi}}\sqrt{\frac{1}{2K}\sum_{i=1}^{K} x_i^2}. \quad (19)$$

Equation (19) relates to the maximum likelihood estimator (MLE).

$$\hat{\sigma} = \sqrt{K \cdot \frac{\Gamma(K+0.5)}{\Gamma(K+1.5)}}\sqrt{\frac{1}{2K}\sum_{i=1}^{K} x_i^2}. \quad (20)$$

Equation (20) relates to the Bayes estimator.

$$\hat{\sigma} = \sqrt{\frac{\frac{1}{K-1}\sum_{i=1}^{K}\left(x_i \frac{1}{K}\sum_{i=1}^{K} x_i\right)^2}{1 - \Gamma^2(1.5)}}. \qquad (21)$$

Equation (21) relates to the moment estimator.

The random variable records from the previous example illustrated in Table 5 are applied using equations 19, 20, and 21 to obtain the MLE, Bayes, and Moment parameter estimates. For each sample record length, the means and the variance of the estimates from the 10000 trials are recorded in Table 6. As the Table indicates, the estimate from the subspace estimation of the present disclosure comes close to matching the MLE and Bayes estimator and performs better than the moment estimator.

TABLE 6

Parameter estimate from the data records in Table 5 using MLE, Bayes, and Moment's estimators (N = 15)

| | MLE | | Bayes | | Moment | |
|---|---|---|---|---|---|---|
| K | Variance | Mean | Variance | Mean | Variance | Mean |
| 30 | 0.0081 | 1.0004 | 0.0083 | 0.9871 | 0.0193 | 0.9884 |
| 50 | 0.0049 | 0.9987 | 0.0048 | 0.9913 | 0.0112 | 0.9935 |
| 100 | 0.0026 | 1.0016 | 0.0025 | 0.9941 | 0.0057 | 0.9978 |
| 200 | 0.0012 | 1.0003 | 0.0012 | 0.9976 | 0.0027 | 0.9987 |
| 300 | 0.00085 | 1.0007 | 0.00084 | 0.9990 | 0.0019 | 0.9991 |
| 400 | 0.00073 | 1.0003 | 0.00073 | 0.9994 | 0.0016 | 0.9993 |
| 500 | 0.00067 | 1.0004 | 0.00067 | 0.9996 | 0.0015 | 0.9992 |
| 600 | 0.00064 | 1.0002 | 0.00064 | 0.9994 | 0.0014 | 0.9989 |

The results derived by equation (19) yielded mean estimates of the parameter for K=50 and K=100 as $\hat{\sigma}=1.0938$ and $\hat{\sigma}=1.03506$, respectively. As indicated, the subspace estimation of the present disclosure estimated the PDFs more accurately than conventional methods.

The examples illustrated herein demonstrate the nature of the estimator of the present disclosure and the ability to use the procedure for estimating PDFs other than the Rayleigh distribution. Although applying the subspace estimation to a PDF requires studying the properties of the nonlinear dynamical system that results, the estimation in its current form can handle a variety of PDF types with reasonable efficiency.

Figure 18A:
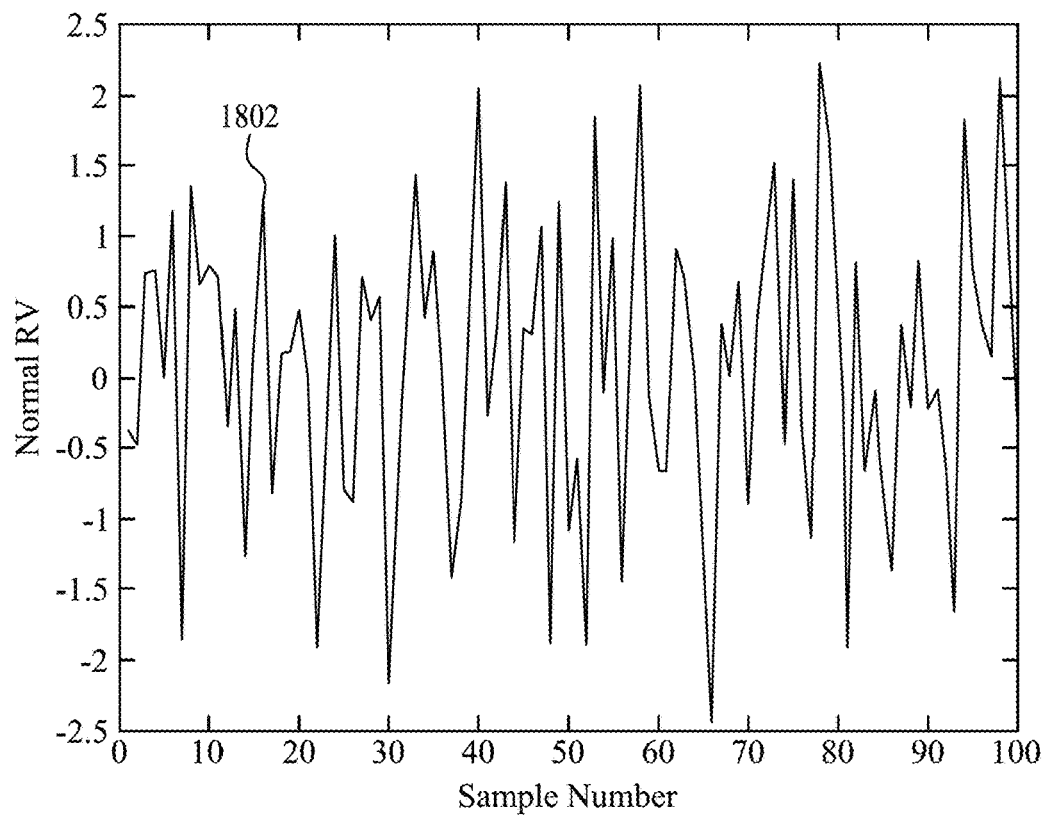
FIG. 18A is a graph of normal RV versus samples numbers for (K=100, $\sigma_o$=1), according to certain embodiments.
Figure 18B:
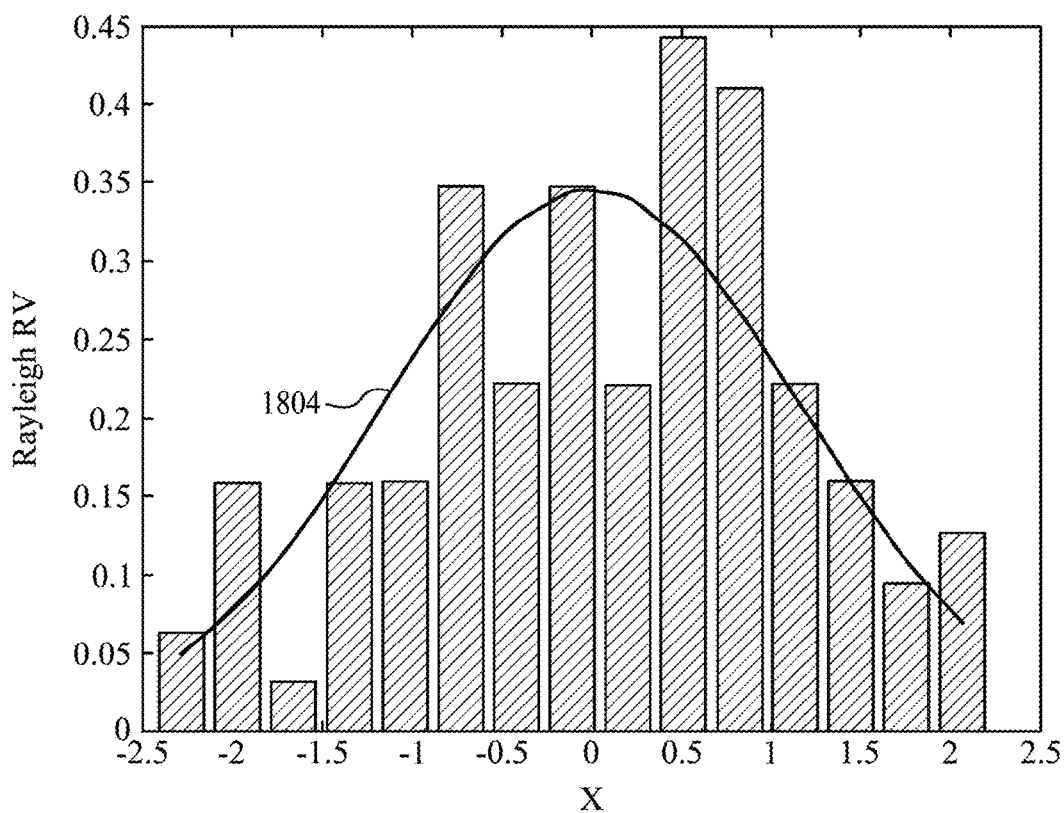
FIG. 18B is a histogram and estimated PDF of normally-distributed random variables for (K=100, $\sigma_o$=1), according to certain embodiments.

FIGS. 18A and 18B demonstrate a first example of estimating a zero-mean normally-distributed RV with σ=1, using equation (22), from a record of 100 samples (K-100) that were used to construct a 15 sample histogram (N=15). FIG. 18A depicts a trace 1802 showing the fluctuation in sample number for K=100 versus normal RV. FIG. 18B depicts a histogram and an estimated PDF curve 1804, where X represents the sample value.

$$P_X(x) = \frac{1}{\sigma\sqrt{2\pi}}\exp\left(-\frac{x^2}{2\sigma^2}\right). \qquad (22)$$

Figure 19:
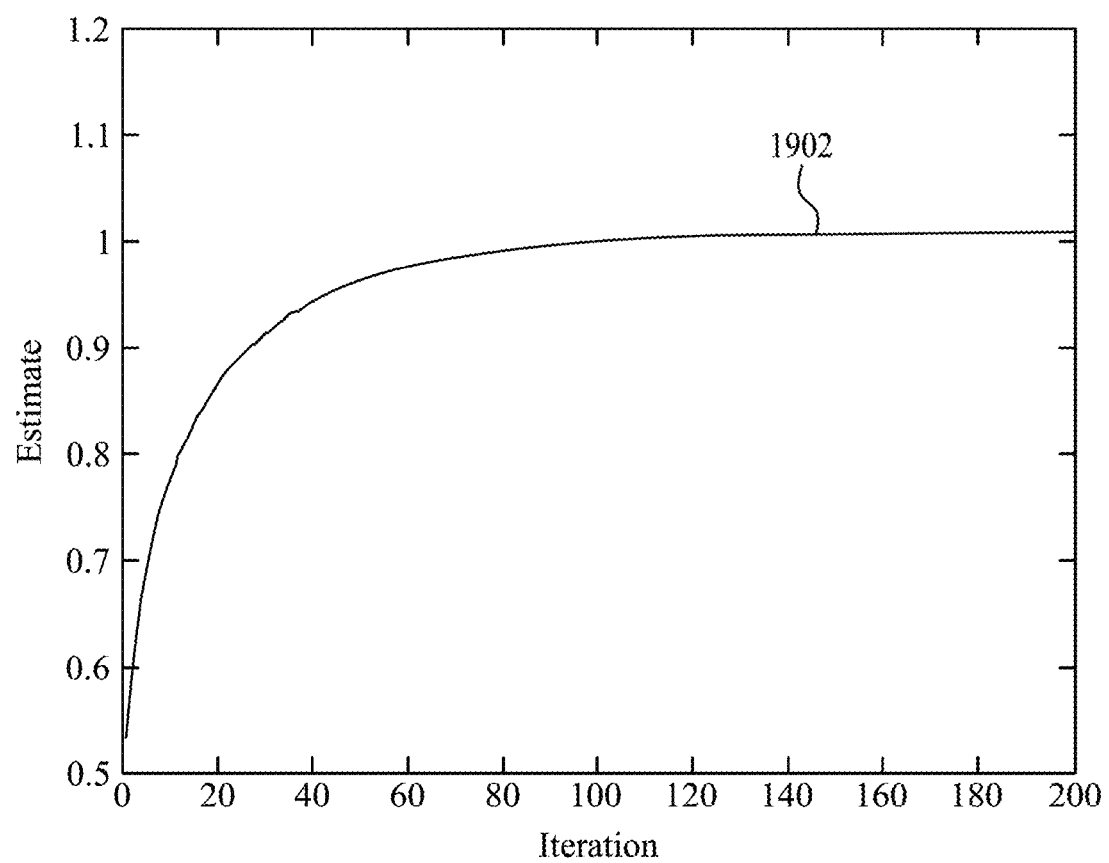
FIG. 19 is a graph of PDF parameter estimate versus iterations, according to certain embodiments.

FIG. 19 illustrates the evolution of the normal PDF parameter estimate 1902 over successive iterations. As shown, the procedure yielded a parameter estimate σ=1.01053 in less than 200 iterations.

Figure 20A:
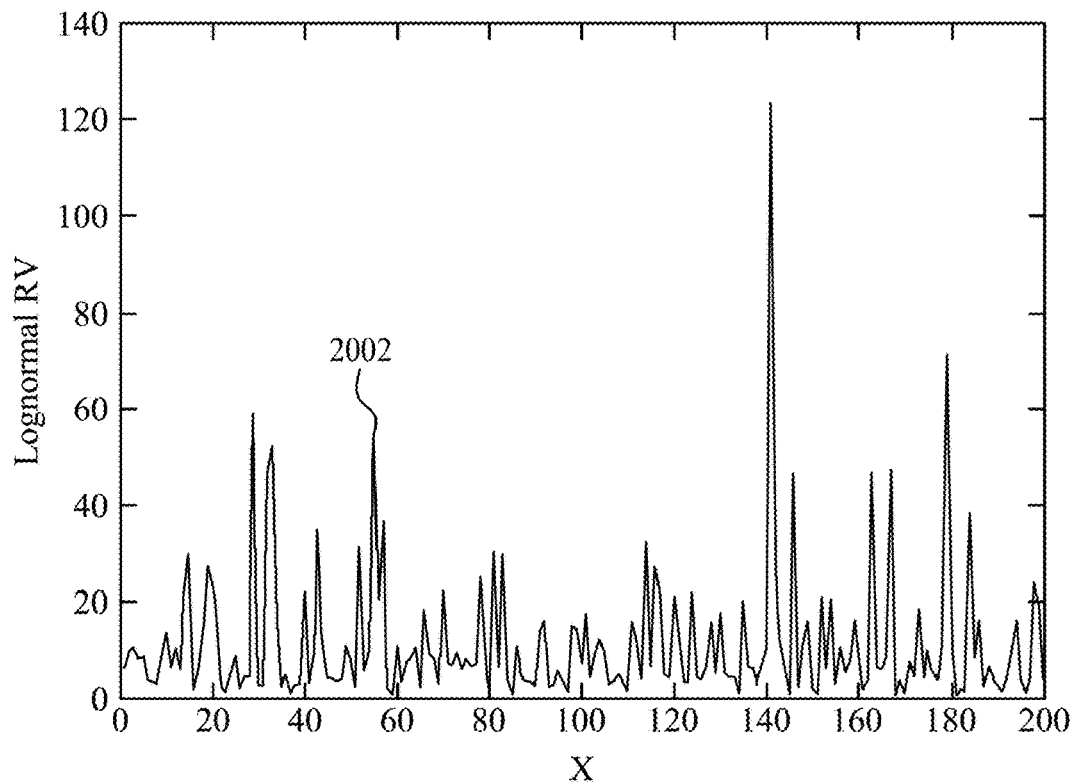
FIG. 20A is a graph of lognormal RV versus samples, according to certain embodiments.
Figure 20B:
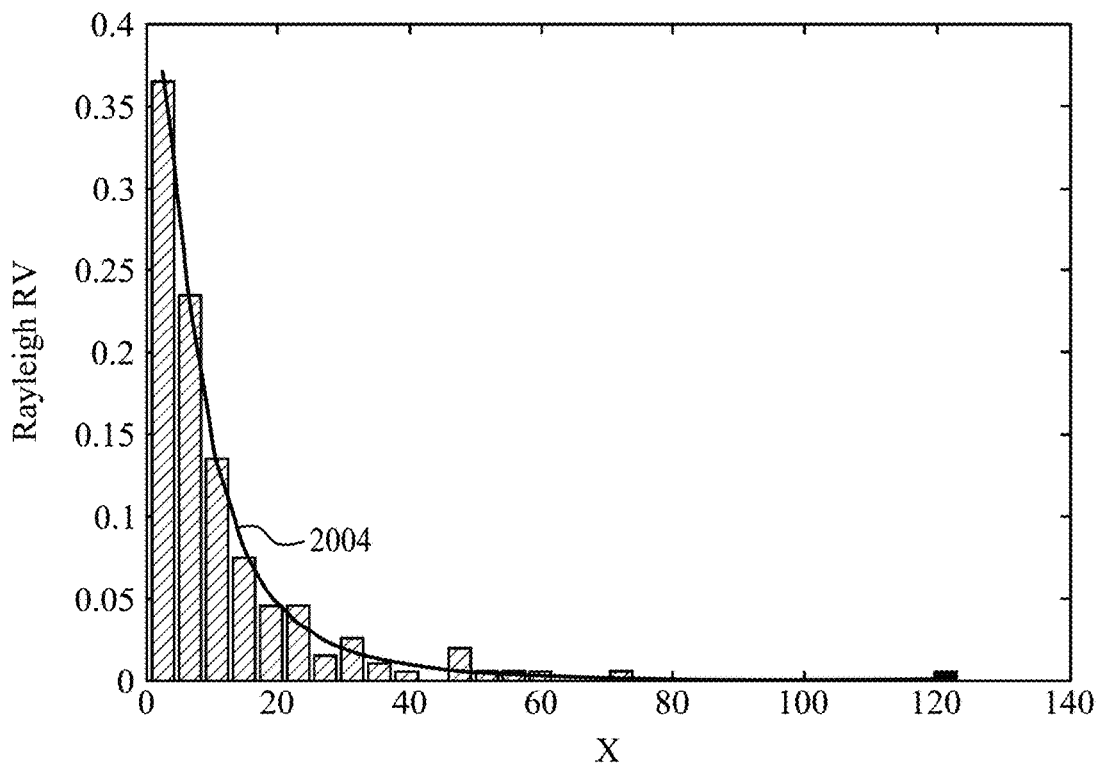
FIG. 20B is a histogram and estimated PDF of the lognormal RV versus samples for $\sigma$=1 and $\mu$=2 according to certain embodiments.

A second example to demonstrate a nature of the estimator is illustrated in FIG. 20A and FIG. 20B. FIG. 20A is a graph of lognormal RV versus sample value, X. The second example estimated the two parameters of a lognormal RV 2002 with σ=1 and μ=2, as considered in equation (23) below from a record of 100 samples (K=100) that were used to construct a 15-sample histogram (N=15) 2004 and estimated PDF of the lognormal RV 2006 as shown in FIG. 20B.

FIG. 20B is a histogram of the estimated PDF of the lognormal RV versus sample values, X, for σ=1 and μ=2.

Figure 21:
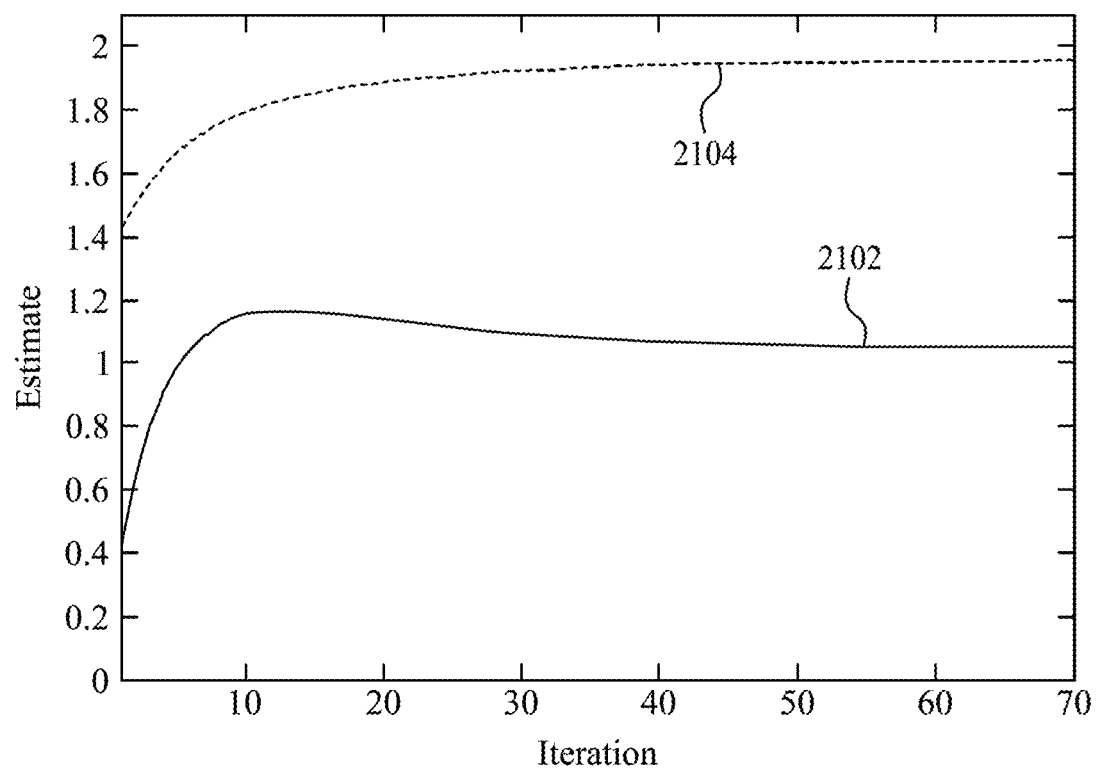
FIG. 21 depicts traces of µ and σ obtained using lognormal PDF parameter estimates versus the number of iterations, according to certain embodiments.

The evolution over iteration of the lognormal PDF parameters estimates is illustrated in FIG. 21. Trace 2102 depicts values for sigma (σ=1) and trace 2104 depicts values for (μ=2) over successive iterations.

The procedure yielded the parameter estimator σ=1.013 and μ=1.96 in less than 50 iterations.

$$P_X(x) = \frac{1}{x\sigma\sqrt{2\pi}}\exp\left(-\frac{(\ln(x)-\mu)^2}{2\sigma^2}\right). \qquad (23)$$

The function of the nonlinear subspace is to embed the a priori available information about the PDF in the estimation process. The embedding restricts the candidates on which the error norm is minimized to only those that belong to the correct types of PDFs being estimated. However, the difference between the nonlinear subspace estimation approach and conventional norm-based estimation techniques is more fundamental than conditional constrained estimation.

Figure 22:
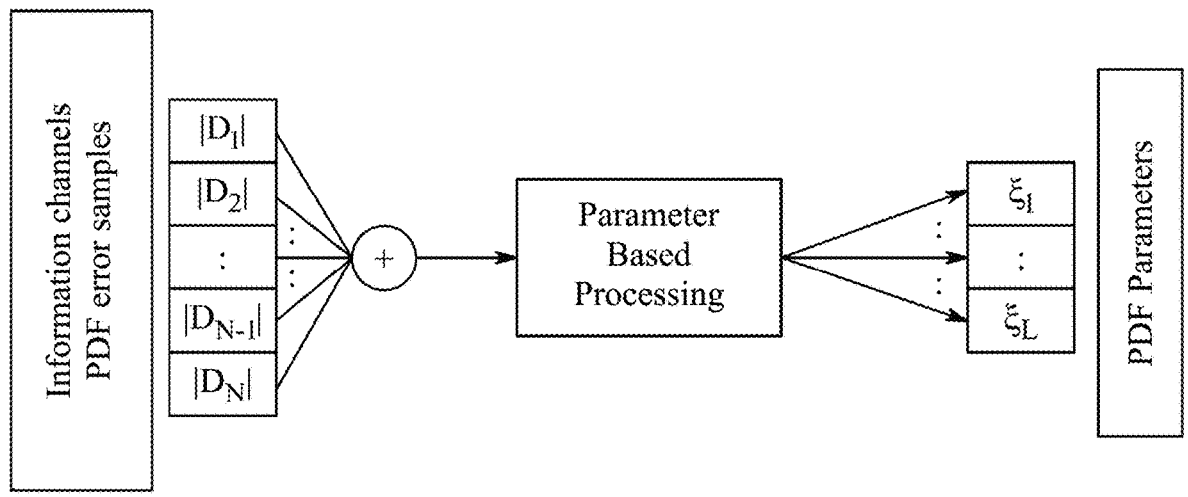
FIG. 22 depicts a structure of traditional norm-based estimators, according to certain embodiments.

As shown in FIG. 22, the norm-based approaches attempt to reduce the complexity of the estimation process. This complexity arises from simultaneously considering the difference between the observation and estimate at each sample as parameterized error channels whose content should be processed and used in adjusting the estimated parameters.

Conventional norm-based methods average the information in all these channels to create one parameterized error whose content is to be processed to obtain the estimate. In essence, the conventional methods amount to the information lossy process of using rough averages to discern fine structures. In addition to the information lossy process, the conventional norm-based methods ignore the sign of the error samples, which is an important source of information.

Figure 23:
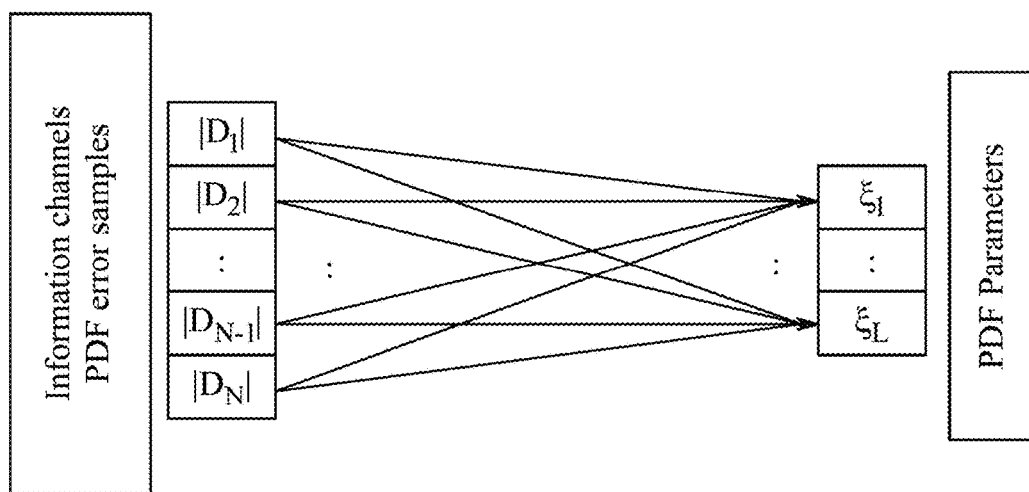
FIG. 23 depicts a parallel-distributed structure of the subspace estimator, according to certain embodiments.

FIG. 23 depicts a parallel-distributed structure of the subspace estimator. Unlike the conventional norm-based methods, the nonlinear subspace estimation of the present disclosure processes each error sample individually. As shown in FIG. 23, the connection is established between multiple error channels and PDF parameters in a connectionism-based parallel-distribution arrangement in a suggested subspace approach. Due to processing each error sample individually and parallel to each other, the outcome of this processing, collaboratively and directly, form the value of the estimate. Even a single error sample is capable of producing an estimate. In essence, the subspace processor is a complex dynamical system that employs massive parallel-distributed processing in generating the estimate.

Parallel-distributed processors are hardware friendly and can perform in real-time. Software implementation, as demonstrated by simulation, is efficient. The number of multiplications and additions needed to generate an estimate at an iteration is linear in the number of the sample and the number of parameters (Number of additions=Number of Multiplications=N·L).

The first embodiment is illustrated with respect to FIG. 1-FIG. 5. The first embodiment describes a system 200 for using Rayleigh probability density functions, PDF, to obtain estimates of channel characteristics for wireless communications. The system includes a computing device 206 configured to generate motion actuation signals and to transmit the motion actuation signals. The system also includes a mobile wireless agent 204 having a receiver antenna configured to receive the motion actuation signals, navigation circuitry 215 configured to use the motion actuation signals to navigate to a physical sensing location, a plurality of sensors configured to capture sensory information at N sample points in a sample space, S, of the physical sensing location. The coordinates of the N sample points of the sensory information are random variables, and communication circuitry 230 is configured to transmit the sensory information over a wireless communications channel having unknown channel characteristics. The system further includes a base station 202 wirelessly connected to the computing device 206 and the mobile wireless agent 204. The base station (BS) 202 includes a receiver configured to receive the sensory information from the mobile wireless agent over the wireless communication channel having unknown channel characteristics and a transmitter configured to transmit the sensory information to the computing device 206. The computing device 206 includes a communication device 222, a memory 217 storing program instructions, and a microprocessor 216 configured to perform the program instructions to: construct a histogram from the coordinates of the random variables of the sensory information, construct a set of parameterized Rayleigh probability density functions, PDF, $P_X(x_i, \xi)$, from the histogram, where each x represents a set of the coordinates in the sample space and $\xi$ is a parameter vector containing a set of L parameters for each $x_i$, where i=1, 2, . . . , N, construct a parameterized vector, $\Psi(\xi)$, from the set of the parameterized Rayleigh PDFs, $P_X(x_i, \xi)$, form a transformation vector, $\hat{\Psi}$, from the histogram for each x, determine a distance, $D(\xi)$, between the transformation vector, $\hat{\Psi}$, and the parameterized vector $\Psi(\xi)$, minimize an absolute value of the distance, $D(\xi)$, form a Jacobian matrix, $J_\xi$, by calculating a partial derivative of the parameterized vector, $\Psi(\xi)$, for each $\xi$, calculate a dot product between a transpose of the Jacobian matrix, $J_\xi$ and the distance, $D(\xi)$, minimize the dot product, and determine a value of each parameter vector, $\xi$, which minimizes the dot product, estimate a set of parameters of the channel characteristics of the wireless communications channel from each set of L parameters of each $\xi$, generate the motion actuation signals for the mobile wireless agent 204 based on the estimated set of parameters, transmit the motion actuation signals and the estimated set of parameters to the base station 202, and transmit, by the base station 202, the motion actuation signals on the wireless communication channel using the estimated set of parameters of the channel characteristics, to the mobile wireless agent.

The estimated set of L parameters of the channel characteristics are derived from a Rayleigh distribution represented by a continuous PDF.

The estimated set of parameters of the channel characteristics for each parameter vector, $\xi$, includes at least one of a mean of the channel characteristics, a norm of the channel characteristics, a variance of the channel characteristics, a scale parameter, $\sigma$, of the channel characteristics and a mode of the channel characteristics.

The transformation vector, $\hat{\Psi}$, includes a component $\Psi_x$, which is a correct measurement due to an actual PDF of a random variable, an error component, $\Psi_{e_t}$, tangent to the sample space, S, and an error component, $\Psi_{e_n}$, that is orthogonal to the sample space, S, such that $\hat{\Psi}_x = \Psi_x + \Psi_{e_t} + \Psi_{e_n}$.

The second embodiment is illustrated with respect to FIG. 1-FIG. 5. The second embodiment describes a method of obtaining estimates of channel characteristics for wireless communications is disclosed. The method includes capturing, with a plurality of sensors of a mobile wireless agent 204, sensory information at N sample points in a sample space, S, of a physical sensing location. The coordinates of the N sample points are random variables. The method includes transmitting, by a communication circuitry 230 of the mobile wireless agent 204, the sensory information over a wireless communication channel having unknown channel characteristics. The method also includes receiving, by a base station 202, the sensory information. The method further includes transmitting, by a BS communication circuitry 210, the sensory information, receiving, by a communication device 222 of a computing device 206, the sensory information from the BS 202. In addition, the method includes performing, by the computing device 206, the steps of: constructing a histogram, including N samples, from the coordinates of the random variables of the sensory information, constructing a set of parameterized Rayleigh probability density functions, PDF, $P_X(x_i, \xi)$ from the N samples of the histogram, where each x represents a set of coordinates in the sample space and $\xi$ is a parameter vector containing a set of L parameters for each x, where i=1, . . . , N, constructing a parameterized vector, $\Psi(\xi)$, from the set of the parameterized Rayleigh PDFs, $P_X(x_i, \xi)$, forming a transformation vector, $\hat{\Psi}$, from the histogram for each x, determining a distance, $D(\xi)$, between the transformation vector, $\hat{\Psi}$, and the parameterized vector $\Psi(\xi)$, minimizing an absolute value of the distance, $D(\xi)$, forming a Jacobian matrix, $J_\xi$, by calculating a partial derivative of the parameterized vector, $\Psi(\xi)$, for each $\xi$, calculating a dot product between a transpose of the Jacobian matrix, $J_\xi$ and the distance, $D(\xi)$, minimizing the dot product, determining a value of each parameter vector, $\xi$, which minimizes the dot product, estimating a set of parameters of the unknown channel characteristics from each set of L parameters of each $\xi$, generating motion actuation signals for the mobile wireless agent 204 based on the estimated set of parameters of the channel characteristics, transmitting, by the communication device 222, the motion actuation signals and the estimated set of parameters to the base station 202, and transmitting, by the base station 202, the motion actuation signals on the wireless communication channel using the estimated set of parameters of the channel characteristics, to the mobile wireless agent.

The channel characteristics are based on a Rayleigh distribution represented by a continuous PDF.

The set of L parameters of each parameter vector, $\xi$, includes at least one of a mean of the channel characteristics, a norm of the channel characteristics, a variance of the channel characteristics, a scale parameter, $\sigma$, of the channel characteristics and a mode of the channel characteristics.

The transformation vector, $\hat{\Psi}$, includes a component $\Psi_x$, which is a correct measurement due to an actual PDF of a random variable, an error component, $\Psi_{e_t}$, tangent to the sample space, S, and an error component, $\Psi_{e_n}$, that is orthogonal to the sample space, S, such that $\hat{\Psi}_x = \Psi_x + \Psi_{e_t} + \Psi_{e_n}$.

The increasing the number of samples, N, reduces the error component, $\Psi_{e_t}$.

An amount of noise in the histogram is inversely proportional to a number of the random variables.

The non-linear subspace ($S_\Lambda$) is formed in the sample space, S, as an image of a parameter space, $\Lambda$, under the parameterized vector, $\Psi(\xi)$.

The components of the parameter space are the coordinates of the parameterized vector, $\Psi(\xi)$.

The third embodiment is illustrated with respect to FIG. 1-FIG. 5. The third embodiment describes a non-transitory computer readable medium having instructions stored therein that, when executed by one or more processors, cause the one or more processors to perform a method of obtaining estimates of channel characteristics for wireless communications. The method includes receiving, from a mobile wireless agent 204, sensory information at N sample points in a sample space, S, of a physical sensing location. The coordinates of the N sample points are random variables over a wireless communication channel having unknown channel characteristics. The method includes constructing a histogram, includes N samples, from the coordinates of the random variables of the sensory information. The method further includes constructing a set of parameterized Rayleigh probability density functions, PDF, $P_X(x_i, \xi)$ from the N samples of the histogram, where each x represents a set of coordinates in the sample space and $\xi$ is a parameter vector containing a set of L parameters for each $x_i$, where i=1, . . ., N. The method also includes constructing a parameterized vector, $\Psi(\xi)$, from the set of the parameterized Rayleigh PDFs, $P_X(x_i, \xi)$. The method also includes forming a transformation vector, $\hat{\Psi}$, from the histogram for each $x_i$. In addition, the method includes determining a distance, $D(\xi)$, between the transformation vector, $\hat{\Psi}$, and the parameterized vector $\Psi(\xi)$. The method includes minimizing an absolute value of the distance, $D(\xi)$. The method further includes forming a Jacobian matrix, $J_\xi$, by calculating a partial derivative of the parameterized vector, $\Psi(\xi)$, for each $\xi$. The method further includes calculating a dot product between a transpose of the Jacobian matrix, $J_\xi$ and the distance, $D(\xi)$. The method also includes minimizing the dot product. The method further includes determining a value of each parameter vector, $\xi$, which minimizes the dot product. The method includes estimating a set of parameters of the unknown channel characteristics from each set of L parameters of each $\xi$. The method further includes generating motion actuation signals for the mobile wireless agent 204 based on the estimated set of parameters. The method also includes transmitting the motion actuation signals and the estimated set of parameters to the base station 202. The method includes transmitting, by the base station 202, the motion actuation signals on the wireless communication channel using the estimated set of parameters of the channel characteristics, to the mobile wireless agent 204.

The channel characteristics are based on a Rayleigh distribution represented by a continuous PDF.

The set of L parameters of each parameter vector, $\xi$, includes at least one of a mean of the channel characteristics, a norm of the channel characteristics, a variance of the channel characteristics, a scale parameter, $\sigma$, of the channel characteristics and a mode of the channel characteristics.

The transformation vector, $\hat{\Psi}$, includes a component $\Psi_x$, which is a correct measurement due to an actual PDF of a random variable, an error component, $\Psi_{e_t}$, tangent to the sample space, S, and an error component, $\Psi_{e_n}$, that is orthogonal to the sample space, S, such that $\hat{\Psi}_x = \Psi_x + \Psi_{e_t} + \Psi_{e_n}$. The increasing the number of samples, N, reduces the error component, $\Psi_{e_t}$.

The amount of noise in the histogram is inversely proportional to a number of the random variables.

The non-linear subspace $(S_\Lambda)$ is formed in the sample space, S, as an image of a parameter space, $\Lambda$, under the parameterized vector, $\Psi(\xi)$.

The components of the parameter space are the coordinates of the parameterized vector, $\Psi(\xi)$.

It is to be noted that the subspace estimation of the PDFs application is not limited to the aforementioned illustration, rather, it can be applied to any type of channel estimation including Pilot Based Channel Estimation (PBCE), Semi-Blind Chennel Estimation (SBCE) and Blind Channel Estimation.

Figure 24:
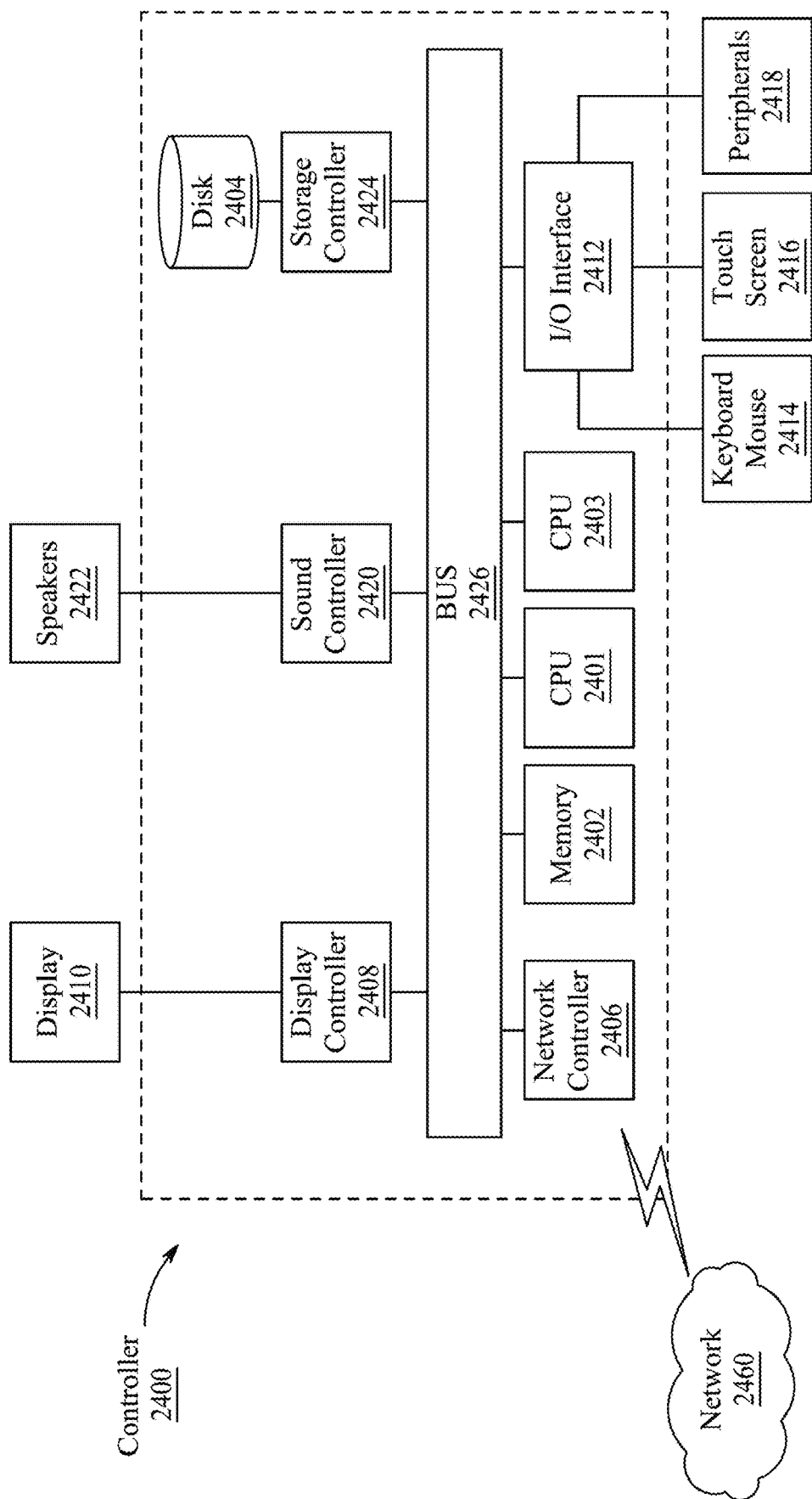
FIG. 24 is an illustration of a non-limiting example of details of computing hardware used in the computing system, according to certain embodiments.

Next, further details of the hardware description of the computing environment of FIG. 2 according to exemplary embodiments is described with reference to FIG. 24. In FIG. 24, a controller 2400 is described as representative of the system 200 of FIG. 2 in which the computing device 206 is a computing device that includes a CPU 2401 which performs the processes described above/below. The process data and instructions may be stored in memory 2402. These processes and instructions may also be stored on a storage medium disk 2404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 2401, 2403 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 2401 or CPU 2403 may be a Xenon or Core processor from Intel of America or an Opteron processor from AMD of America, or may be other processor types that would be recognized by one of ordinary skill in the art. Alternatively, the CPU 2401, 2403 may be implemented on an FPGA, ASIC, PLD or using discrete logic circuits, as one of ordinary skilled in the art would recognize. Further, CPU 2401, 2403 may be implemented as multiple processors cooperatively working in parallel to perform the instructions of the inventive processes described above.

The computing device in FIG. 24 also includes a network controller 2406, such as an Intel Ethernet PRO network interface card from Intel Corporation of America, for interfacing with network 2460. As can be appreciated, the network 2460 can be a public network, such as the Internet, or a private network such as an LAN or WAN network, or any combination thereof and can also include PSTN or ISDN sub-networks. The network 2460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 2408, such as a NVIDIA GeForce GTX or Quadro graphics adaptor from NVIDIA Corporation of America for interfacing with display 2410, such as a Hewlett Packard HPL2445w LCD monitor. A general purpose I/O interface 2412 interfaces with a keyboard and/or mouse 2414 as well as a touch screen panel 2416 on or separate from display 2417. General purpose I/O interface also connects to a variety of peripherals 2417 including printers and scanners, such as an OfficeJet or DeskJet from Hewlett Packard.

A sound controller 2420 is also provided in the computing device such as Sound Blaster X-Fi Titanium from Creative, to interface with speakers/microphone 2422 thereby providing sounds and/or music.

The general-purpose storage controller 2424 connects the storage medium disk 2404 with communication bus 2426, which may be an ISA, EISA, VESA, PCI, or similar, for interconnecting all of the components of the computing device. A description of the general features and functionality of the display 2418, keyboard and/or mouse 2414, as well as the display controller 2408, storage controller 2424, network controller 2406, sound controller 2420, and general purpose I/O interface 2412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 22.

Figure 25:
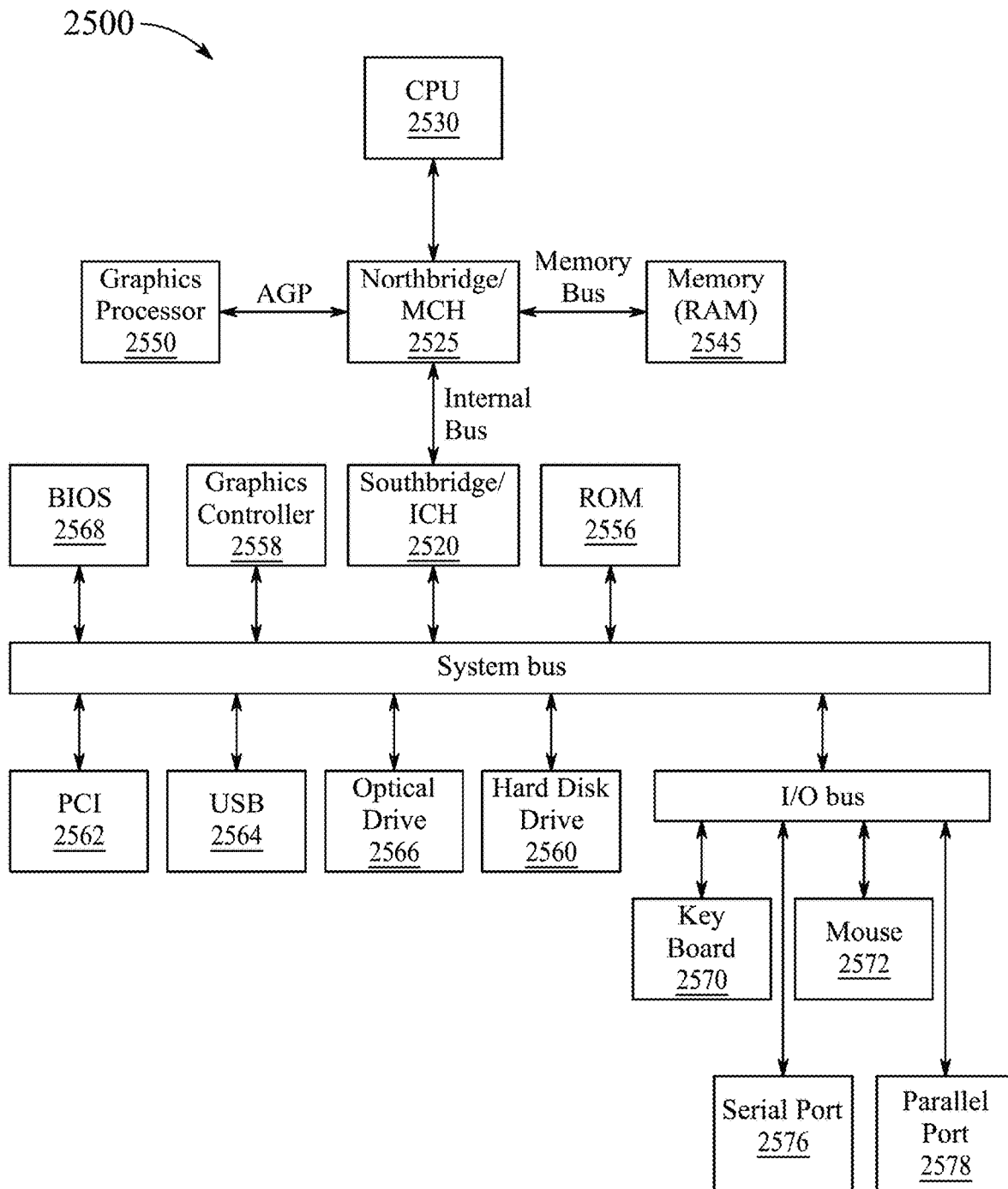
FIG. 25 is an exemplary schematic diagram of a data processing system used within the computing system, according to certain embodiments.

FIG. 25 shows a schematic diagram of a data processing system, according to certain embodiments, for performing the functions of the exemplary embodiments. The data processing system is an example of a computer in which code or instructions implementing the processes of the illustrative embodiments may be located.

In FIG. 25, data processing system 2500 employs a hub architecture including a north bridge and memory controller hub (NB/MCH) 2525 and a south bridge and input/output (I/O) controller hub (SB/ICH) 2520. The central processing unit (CPU) 2530 is connected to NB/MCH 2525. The NB/MCH 2525 also connects to the memory 2545 via a memory bus, and connects to the graphics processor 2550 via an accelerated graphics port (AGP). The NB/MCH 2525 also connects to the SB/ICH 2520 via an internal bus (e.g., a unified media interface or a direct media interface). The CPU Processing unit 2530 may contain one or more processors and even may be implemented using one or more heterogeneous processor systems.

Figure 26:
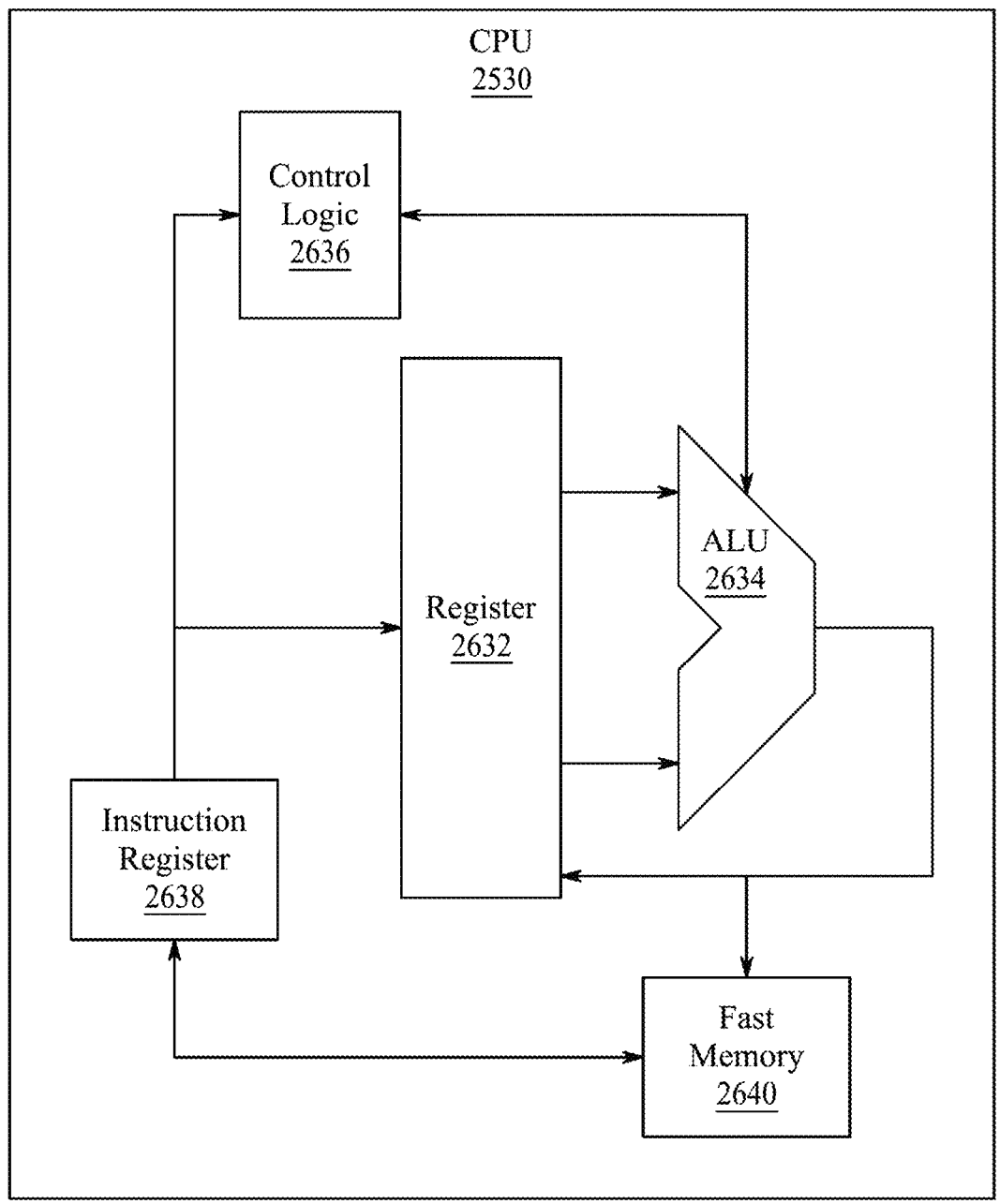
FIG. 26 is an exemplary schematic diagram of a processor used with the computing system, according to certain embodiments.
Figure 27:
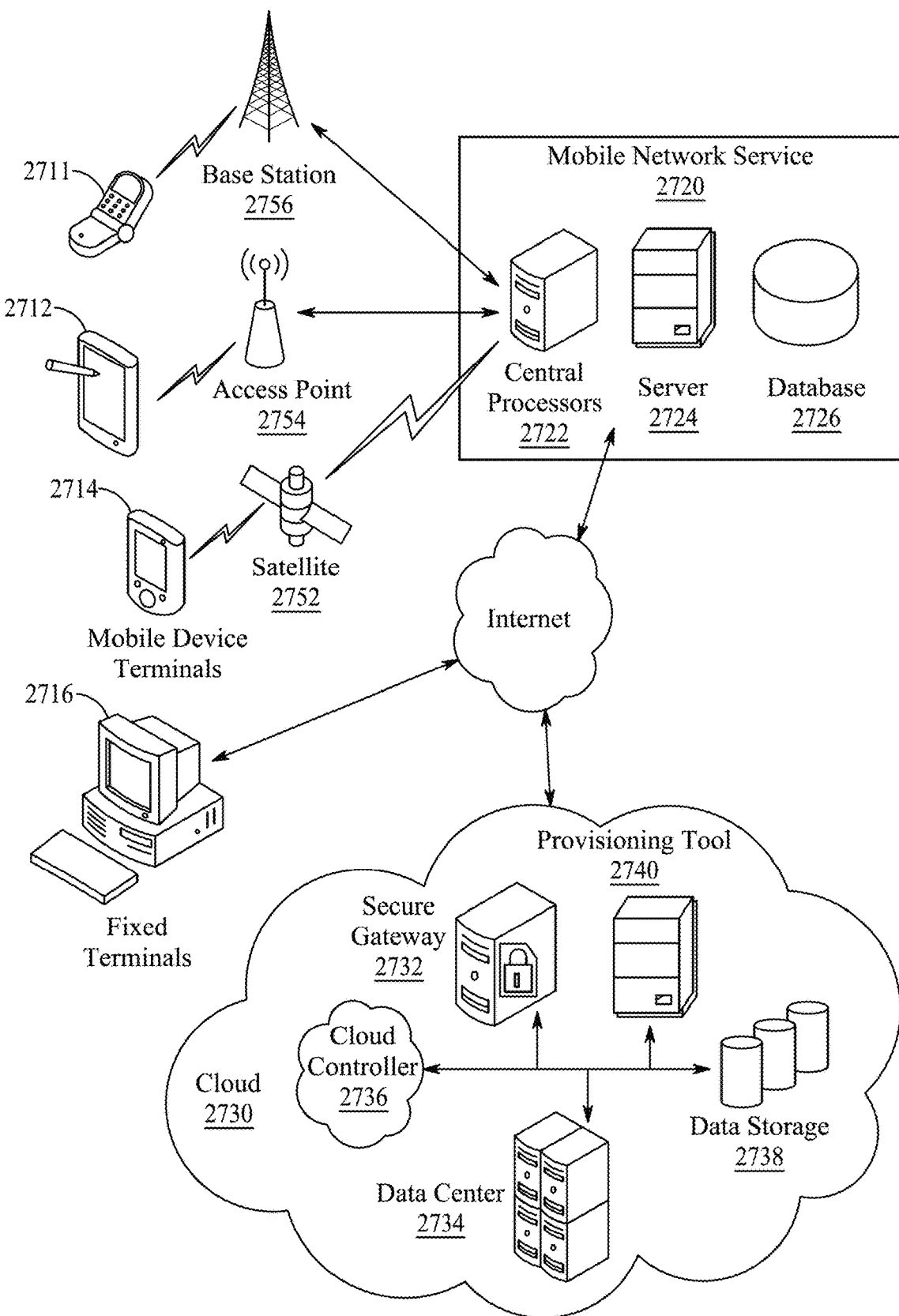
FIG. 27 is an illustration of a non-limiting example of distributed components that may share processing with the controller, according to certain embodiments.

For example, FIG. 26 shows one implementation of CPU 2530. In one implementation, the instruction register 2638 retrieves instructions from the fast memory 2640. At least part of these instructions is fetched from the instruction register 2638 by the control logic 2636 and interpreted according to the instruction set architecture of the CPU 1130. Part of the instructions can also be directed to the register 2632. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 2634 that loads values from the register 2632 and performs logical and mathematical operations on the loaded values according to the instructions. The results from these operations can be feedback into the register and/or stored in the fast memory 2640. According to certain implementations, the instruction set architecture of the CPU 2630 can use a reduced instruction set architecture, a complex instruction set architecture, a vector processor architecture, a very large instruction word architecture. Furthermore, the CPU 2630 can be based on the Von Neuman model or the Harvard model. The CPU 2630 can be a digital signal processor, an FPGA, an ASIC, a PLA, a PLD, or a CPLD. Further, the CPU 2630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 25, the data processing system 2500 can include that the SB/ICH 2520 is coupled through a system bus to an I/O Bus, a read only memory (ROM) 856, universal serial bus (USB) port 2564, a flash binary input/output system (BIOS) 2568, and a graphics controller 2558. PCI/PCIe devices can also be coupled to SB/ICH 2588 through a PCI bus 2562.

The PCI devices may include, for example, Ethernet adapters, add-in cards, and PC cards for notebook computers. The Hard disk drive 2560 and CD-ROM 2566 can use, for example, an integrated drive electronics (IDE) or serial advanced technology attachment (SATA) interface. In one implementation the I/O bus can include a super I/O (SIO) device.

Further, the hard disk drive (HDD) 2560 and optical drive 2566 can also be coupled to the SB/ICH 2520 through a system bus. In one implementation, a keyboard 2570, a mouse 2572, a parallel port 2578, and a serial port 2576 can be connected to the system bus through the I/O bus. Other peripherals and devices that can be connected to the SB/ICH 2520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended backup load to be powered.

The functions and features described herein may also be executed by various distributed components of a system. For example, one or more processors may execute these system functions, where the processors are distributed across multiple components communicating in a network. The distributed components may include one or more client and server machines, which may share processing, as shown by FIG. 26, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 26 illustrates client devices including smart phone 2619, tablet 2612, mobile device terminal 2614 and fixed terminals 2616. These client devices may be commutatively coupled with a mobile network service 2619 via base station 2656, access point 2654, satellite 2652 or via an internet connection. Mobile network service 2619 may comprise central processors 2622, server 2624 and database 2623. Fixed terminals 2616 and mobile network service 2620 may be commutatively coupled via an internet connection to functions in cloud 2630 that may comprise security gateway 2632, data center 2634, cloud controller 2636, data storage 2638 and provisioning tool 2640.

The above-described hardware description is a non-limiting example of corresponding structure for performing the functionality described herein.

The invention claimed is:

1. A method of obtaining estimates of channel characteristics for wireless communications, the method comprising:
   capturing, with a plurality of sensors of a mobile wireless agent, sensory information at N sample points in a sample space, S, of a physical sensing location, wherein coordinates of the N sample points are random variables;
   transmitting, by a communication circuitry of the mobile wireless agent, the sensory information over a wireless communication channel having unknown channel characteristics;
   receiving, by a base station (BS), the sensory information;
   transmitting, by a BS communication circuitry, the sensory information;
   receiving, by a communication device of a computing device, the sensory information from the BS;
   performing, by the computing device, the steps of:
      constructing a histogram, comprising N samples, from the coordinates of the random variables of the sensory information;
      constructing a set of parameterized Rayleigh probability density functions, PDF, $P_X(x_i, \xi)$ from the N samples of the histogram, where each x represents a set of coordinates in the sample space and $\xi$ is a parameter vector containing a set of L parameters for each x, where i=1, ..., N;
      constructing a parameterized vector, $\Psi(\xi)$, from the set of the parameterized Rayleigh PDFs, $P_X(x_i, \xi)$;
      forming a transformation vector, $\hat{\Psi}$, from the histogram for each x;
      determining a distance, $D(\xi)$, between the transformation vector, $\hat{\Psi}$, and the parameterized vector $\Psi(\xi)$;
      minimizing an absolute value of the distance, $D(\xi)$;
      forming a Jacobian matrix, $J_\xi$, by calculating a partial derivative of the parameterized vector, $\Psi(\xi)$, for each $\xi$;
      calculating a dot product between a transpose of the Jacobian matrix, $J_\xi$ and the distance, $D(\xi)$;
      minimizing the dot product;
      determining a value of each parameter vector, $\xi$, which minimizes the dot product;
      estimating a set of parameters of the unknown channel characteristics from each set of L parameters of each $\xi$;
   generating motion actuation signals for the mobile wireless agent based on the estimated set of parameters of the channel characteristics, wherein the motion actuation signals include a navigation signal and a peripheral device control signal;
   transmitting, by the communication device, the motion actuation signals and the estimated set of parameters to the base station; and
   transmitting, by the BS communication circuitry, the motion actuation signals on the wireless communication channel using the estimated set of parameters of the channel characteristics, to the mobile wireless agent.

2. The method of claim 1, wherein the channel characteristics are based on a Rayleigh distribution represented by a continuous PDF.

3. The method of claim 1, wherein the set of L parameters of each parameter vector, $\xi$, comprises at least one of a mean of the channel characteristics, a norm of the channel characteristics, a variance of the channel characteristics, a scale parameter, $\sigma$, of the channel characteristics and a mode of the channel characteristics.

4. The method of claim 1, wherein the transformation vector, $\hat{\Psi}$, comprises a component $\Psi_x$, which is a correct measurement due to an actual PDF of a random variable, an error component, $\Psi_{e_t}$, tangent to the sample space, S, and an error component, $\Psi_{e_n}$, that is orthogonal to the sample space, S, such that $\hat{\Psi}_x = \Psi_x + \Psi_{e_t} + \Psi_{e_n}$.

5. The method of claim 4, wherein increasing the number of samples, N, reduces the error component, $\Psi_{e_t}$.

6. The method of claim 1, wherein an amount of noise in the histogram is inversely proportional to a number of the random variables.

7. The method of claim 1, wherein a non-linear subspace ($S_\Lambda$) is formed in the sample space, S, as an image of a parameter space, $\Lambda$, under the parameterized vector, $\Psi(\xi)$.

8. The method of claim 7, wherein the components of the parameter space are the coordinates of the parameterized vector, $\Psi(\xi)$.

* * * * *